US011930020B2

(12) United States Patent
Dong et al.

(10) Patent No.: US 11,930,020 B2
(45) Date of Patent: Mar. 12, 2024

(54) DETECTION AND MITIGATION OF SECURITY THREATS TO A DOMAIN NAME SYSTEM FOR A COMMUNICATION NETWORK

(71) Applicant: MICROSOFT TECHNOLOGY LICENSING, LLC, Redmond, WA (US)

(72) Inventors: Zheng Dong, Redmond, WA (US); Jack Wilson Stokes, III, North Bend, WA (US); Jie Li, Bellevue, WA (US); Jinyuan Jia, Durham, NC (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 435 days.

(21) Appl. No.: 17/317,573

(22) Filed: May 11, 2021

(65) Prior Publication Data
US 2022/0385673 A1 Dec. 1, 2022

(51) Int. Cl.
*H04L 29/06* (2006.01)
*G06F 16/901* (2019.01)
(Continued)

(52) U.S. Cl.
CPC ...... *H04L 63/1416* (2013.01); *G06F 16/9024* (2019.01); *G06N 20/00* (2019.01); *H04L 61/4511* (2022.05)

(58) Field of Classification Search
CPC . H04L 63/1416; H04L 61/4511; G06N 20/00; G06F 16/9024
See application file for complete search history.

(56) References Cited

U.S. PATENT DOCUMENTS 10,382,478 B2    8/2019    Rodriguez et al.
10,742,591 B2    8/2020    Nguyen et al.
2018/0176232 A1*  6/2018    Rodriguez .......... H04L 61/4511

OTHER PUBLICATIONS

Chung, et al., "A longitudinal, End-to-End View of the DNSSEC Ecosystem", In the Proceedings of the 26th USENIX Security Symposium, Aug. 16, 2017, pp. 1307-1322.
(Continued)

*Primary Examiner* — Jeffrey C Pwu
*Assistant Examiner* — Thong P Truong
(74) *Attorney, Agent, or Firm* — Shook, Hardy & Bacon L.L.P.

(57) ABSTRACT

The disclosure is directed towards the real-time detection and mitigation of security threats to a domain name system (DNS) for a communication network. A graph-theoretic method is applied to detect compromised DNS assets (e.g., DNS servers and web servers that DNS servers map domain names to). A graph is generated from domain name resolution (DNR) transactions. The nodes of the graph represent the DNS assets and edges between the nodes represent the DNR transactions. The graph is analyzed to detect features that signal compromised assets. The detection of such features serves to act as a binary classifier for the represented assets. The binary classifier acts to classify each node as non-compromised or compromised. The analysis is guided by supervised and/or unsupervised machine learning methods. Once the assets are classified, DNR transactions are analyzed in real-time. If the transaction involves a compromised asset, an intervention is performed that mitigates the threat.

17 Claims, 8 Drawing Sheets

(51) Int. Cl.
G06N 20/00 (2019.01)
H04L 9/40 (2022.01)
H04L 61/4511 (2022.01)

(56) References Cited

OTHER PUBLICATIONS

Zhauniarovich, et al., "A Survey on Malicious Domains Detection through DNS Data Analysis", In General of ACM Computing Surveys, vol. 1, Issue 1, May 22, 2018, pp. 1-35.
"International Search Report & Written Opinion issued in PCT Application No. PCT/US22/028023", dated Aug. 17, 2022, 12 Pages.
"Tensorflow", Retrieved From: https://web.archive.org/web/20210208195828/https://www.tensorflow.org/, Feb. 8, 2021, 14 Pages.
Akritidis, et al., "Proximity Breeds Danger: Emerging Threats in Metro-area Wireless Networks", In Proceedings of 16th USENIX Security Symposium, Aug. 6, 2007, pp. 323-338.
Arends, et al., "DNS Security Introduction and Requirements", Retrieved From: https://www.ietf.org/rfc/rfc4033.txt, Mar. 2005, 22 Pages.
Aynaud, Thomas, "Louvain Community Detection", Retrieved From: https://github.com/taynaud/python-louvain, Dec. 27, 2020, 3 Pages.
Blondel, et al., "Fast Unfolding of Communities in Large Networks", In Journal of Statistical Mechanics: Theory and Experiment, vol. 2008, No. 10, Oct. 9, 2008, 12 Pages.
Cao, et al., "Anti-Phishing Based on Automated Individual White-List", In Proceedings of the 4th ACM workshop on Digital Identity Management, Oct. 31, 2008, pp. 51-60.
Chen, Joseph C. , "Exploit kit Novidade Found Targeting Home Routers", Retrieved From: https://www.trendmicro.com/en_us/research/18/l/new-exploit-kit-novidade-found-targeting-home-and-soho-routers.html#:~:text=Analysis%20of%20the%20Novidade%20exploit,which%20they're%20authenticated%20with., Dec. 11, 2018, 12 Pages.
Gastellier-Prevost, et al., "A Dual Approach to Detect Pharming Attacks at the Client-Side", In Proceedings of 4th IFIP International Conference on New Technologies, Mobility and Security, Feb. 7, 2011, 05 Pages.
Grover, et al., "node2vec: Scalable Feature Learning for Networks", In Proceedings of the 22nd ACM SIGKDD International Conference on Knowledge Discovery and Data Mining, Aug. 13, 2016, pp. 855-864.
Karlof, et al., "Dynamic Pharming Attacks and Locked Same-origin Policies for Web Browsers", In Proceedings of the 14th ACM Conference on Computer and Communications Security, Oct. 29, 2007, pp. 58-71.
Lian, et al., "Measuring the Practical Impact of dnssec Deployment", In Proceedings of 22nd USENIX Security Symposium, Aug. 14, 2013, pp. 573-588.
Mockapetris, P.V, "Rfc1034: Domain names-concepts and facilities", Retrieved From: https://dl.acm.org/doi/pdf/10.17487/RFC1034, Nov. 1987, 55 Pages.
Ollmann, Gunter, "The Pharming Guide", Retrieved From: https://research.nccgroup.com/wp-content/uploads/2020/07/thepharmingguide.pdf, 2005, 37 Pages.
Pearl, Judea, "Probabilistic Reasoning in Intelligent Systems: Networks of Plausible Inference", In Publication of Morgan Kaufmann, 1988, 557 Pages.
Perta, et al. , "A Glance Through the vpn Looking Glass: Ipv6 Leakage and dns Hijacking in Commercial vpn Clients", In Proceedings on Privacy Enhancing Technologies, vol. 2015, Issue 1, Apr. 18, 2015, pp. 77-91.
Ramasubramanian, et al., "Perils of Transitive Trust in the Domain Name System", In Proceedings of the 5th ACM SIGCOMM Conference on Internet Measurement, Oct. 19, 2005, pp. 379-384.
Satam, et al., "Dns-ids: Securing dns in the Cloud Era", In Proceedings of International Conference on Cloud and Autonomic Computing, Sep. 21, 2015, pp. 296-301.
Stamm, et al., "Drive-by-pharming", In Proceedings of International Conference on Information and Communications Security, Dec. 12, 2007, pp. 495-506.
Stewart, Joe, "Dns Cache Poisoning—the Next Generation", Retrieved From: https://web.archive.org/web/20140209181224/https://www.ida.liu.se/~TDDC03/literature/dnscache.pdf, Feb. 9, 2014, 15 Pages.
Tsow, et al., "Warkitting: the Drive-by Subversion of Wireless Home Routers", In Journal of Digital Forensic Practice, vol. 1, Issue 3, Sep. 2006, 21 Pages.
Tyshetskiy, et al., "StellarGraph Machine Learning Library", Retrieved From: https://web.archive.org/web/20201112042326/https://github.com/stellargraph/stellargraph, Nov. 12, 2020, 12 Pages.
Wang, Binghui, "Sybildetection", Retrieved From: https://web.archive.org/web/20201211040837/https://github.com/binghuiwang/sybildetection, Dec. 11, 2020, 2 Pages.
Wang, et al., "SybilSCAR: Sybil Detection in Online Social Networks via Local Rule Based Propagation", In Proceedings of IEEE INFOCOM 2017—IEEE Conference on Computer Communications, May 1, 2017, pp. 1-9.
Yang, et al., "Deploying Cryptography in Internet-Scale Systems: A Case Study on dnssec", In Journal of IEEE Transactions on Dependable and Secure Computing, vol. 8, Issue 5, Sep. 2011, pp. 656-669.

* cited by examiner

DETECTION AND MITIGATION OF SECURITY THREATS TO A DOMAIN NAME SYSTEM FOR A COMMUNICATION NETWORK

BACKGROUND

The Domain Name System (DNS) provides services that are critical to the operation of the modern Internet. Namely, the DNS provides a critical translation function between user-friendly domain names (e.g., Microsoft.com), which tend to be based on natural language phrases, and the less-user friendly internet protocol (IP) addresses (e.g., IPv4 or IPv6 addresses), which are numerical- or bit-based and are the underlying unique logical addresses upon which the Internet relies upon. As per the operation of the modern Internet, when a user wants information (e.g., a web page) from a remote machine (e.g., a web server), the user often provides their web browser with a domain name (e.g., www.my_favorite_website.com). This user action triggers a sequence of follow-on actions. The user's machine (located at the user's IP address) initiates this sequence by sending a request or query to another machine (e.g., a DNS server) over the Internet. The request may be a domain name to IP address resolution (or translation) request. The DNS server is located at another IP address (e.g., a DNS IP address), which the user's machine (or gateway/router device) may already have knowledge of such that the user's machine may readily communicate with the DNS server.

Upon receiving this name resolution request, the DNS server may employ a lookup table to resolve the domain name (e.g., the lookup table encodes a mapping between the domain name and an IP address corresponding to a machine associated with the domain name). The DNS server provides the user's machine with the IP address that corresponds to the requested machine (e.g., the web server). The user's machine may then send an information request to the web server located at the IP address that corresponds to the machine logically located within the domain name. The web server may then provide the user's machine with the requested information (e.g., the web page). To enable subsequent information exchanges between the user's machine and the domain's machine located at the IP address, the user's machine may temporarily cache the mapping between the domain name and the IP address of the domain's machine. In order to decrease network latencies, and in addition to sending the IP address to the user's machine, some network architectures may employ the DNS server to send the user's information request directly to the IP address (in such architectures, the user's machine may provide the initial information request directly to the DNS server).

Note that this brief explanation of the DNS simplifies some of the complexities of the modern Internet. The mapping between domain names and IP addresses may not be a one-to-one mapping. For example, a single (but popular) domain may have numerous machines (and corresponding IP addresses) dedicated to servicing information requests originating from various locations scattered around the global environment. The DNS may make intelligent decisions regarding which IP address (of the multiple IP addresses) to provide based on various factors such as current utilization and/or availability of the multiple machines, the geo-locations of the currently available (or under-utilized) machines relative to the user's machine, the nature of the user's information request (e.g., what type of content the user is requesting), and the like. Thus, the DNS provides load balancing and other functionalities that are critical to the operation of the modern Internet. With DNS' capability in IP address (and/or domain name) resolution, most internet users can enjoy the more user-friendly domain names during their web browsing.

The security of the native DNS infrastructure relies on two important assumptions. First, DNS security relies on the assumption that each DNS server is trustworthy, and secondly that the communication channel between the user's machine and the DNS server is not compromised. The first assumption of trustworthiness applies to the DNS server to which end users send their domain queries. This assumption of trustworthiness must also be applied to one or more downstream DNS servers that, when the upstream DNS server does not have a response to the query, are invoked in a recursive process to resolve the domain name. Regarding the second assumption that the communication channel between the user and the DNS server(s) is secure and/or trustworthy, if the communication channel is not secure, an attacker may forge or modify a DNS request or DNS response at some point along its transmission along the communication channel. Due to the arms race inherent with the adversarial-nature of Internet security, malicious strategies for disrupting the security of DNS services are continuing in their evolution towards greater and greater sophistication. Thus, for users attempting to thwart the efforts of malicious internet users (some of which may now be at least partially funded by one or more nation-states), meeting both of these DNS security assumptions (trustworthiness of both the DNS servers and DNS communication channels) is continuing to become more and more difficult.

SUMMARY

Various aspects of the technology described herein are generally directed to systems, methods, and computer storage media, for among other things, detecting and mitigating security threats to a Domain Name System (DNS) that enables a communication network (e.g., the Internet). One exemplary, but non-limiting, method includes accessing network traffic (NT) data. The NT data may encode at least one domain name resolution (DNR) transaction. The at least one DNR transaction may be associated with a plurality of addresses. The plurality of addresses may include a plurality of domain name system (DNS) addresses and at least one target address. The method may employ the NT data to generate a graph data structure (or simply a data structure). The graph data structure may include a plurality of nodes representing the plurality of addresses and a plurality of edges. The plurality of nodes may include a plurality of DNS nodes that represents the plurality of DNS addresses. The plurality of nodes may additionally include a at least one target node that represents the at least one target address. The plurality of edges may connect each of the plurality of DNS nodes to one or more of the at least one target node based on the at least one DNR transaction. The method may further assign a node risk score to each of the plurality of nodes based on a structure of the graph data structure. A first portion of the plurality of nodes may be identified based on the node risk score assigned to each of the plurality of nodes. Each address of the plurality of addresses that is represented by a node that is included in the identified first portion of the plurality of nodes may be classified as a suspicious address. The method may further provide an indication of at least one address of the plurality of addresses that has been classified as a suspicious address.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
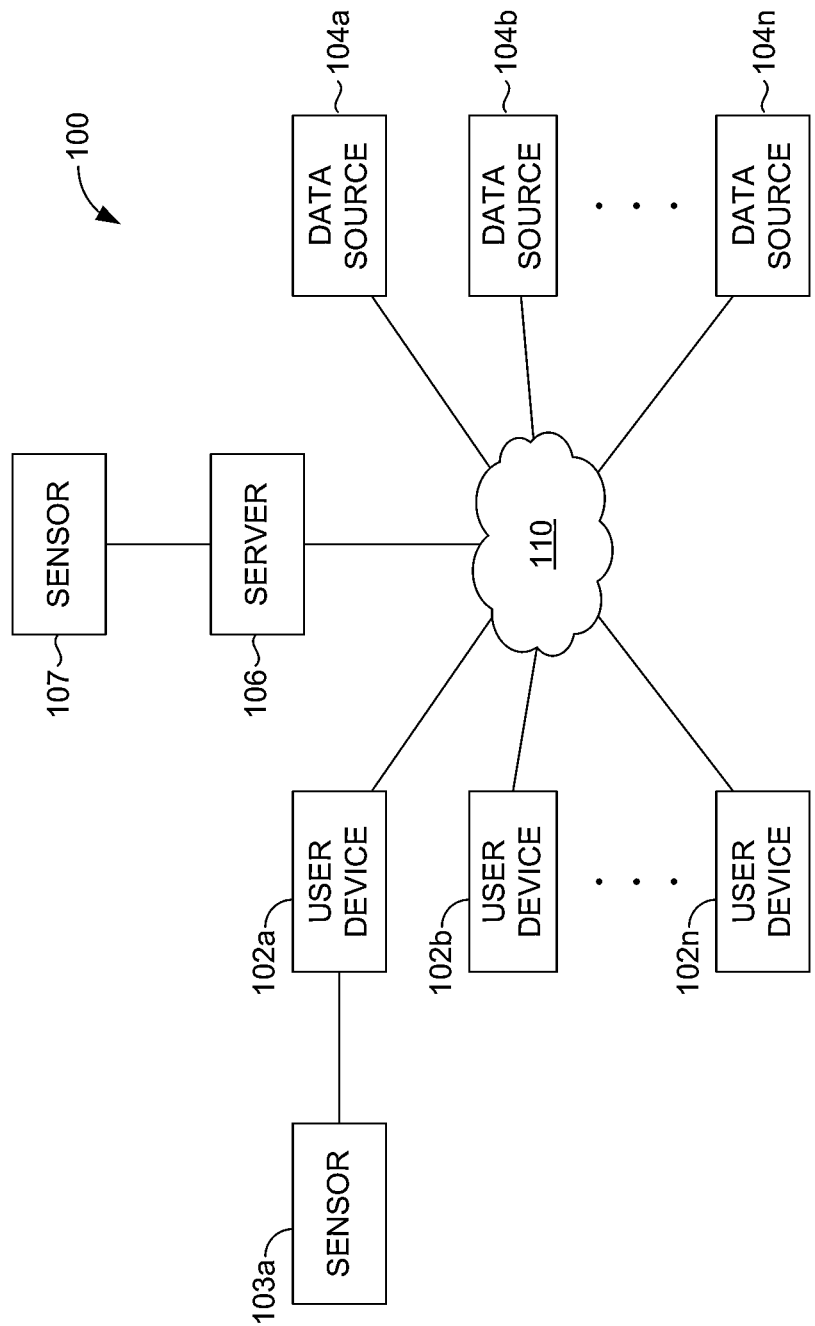
FIG. 1 illustrates a block diagram showing an example operating environment in which some embodiments of the present disclosure may be employed.

Overview of Technical Problems, Technical Solutions, and Technological Improvements As used herein, the term "set" may be employed to refer to an ordered (i.e., sequential) or an unordered (i.e., nonsequential) collection of objects (or elements), such as but not limited to machines (e.g., computer devices), physical and/or logical addresses, graph nodes, graph edges, and the like. A set may include N elements, where N is any nonnegative integer. That is, a set may include 0, 1, 2, 3, . . . N objects and/or elements, where N is a positive integer with no upper bound. Therefore, as used herein, a set may be a null set (i.e., an empty set), that includes no elements (e.g., N=0 for the null set). A set may include only a single element. In other embodiments, a set may include a number of elements that is significantly greater than one, two, three, or billions of elements. A set may be an infinite set or a finite set. In some embodiments, "a set of objects" that is not a null set of the objects may be interchangeably referred to as either "one or more objects" or "at least one object." A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or strict subset of set A. For example, set A and set B may be equal sets, and set B may be referred to as a subset of set A. In such embodiments, set A may also be referred to as a subset of set B. Two sets may be disjoint sets if the intersection between the two sets is the null set.

As used herein, the term "machine" may refer to a computing device enabled to be connected to a communication network (e.g., the Internet, an intranet, a peer-to-peer network, a mesh network, or the like). A machine may include, but is not otherwise limited to a computer (e.g., a desktop, a laptop, a mobile device, a wearable device, an internet-of-things (IoT) device, a server, or the like). A machine may include a communication network machine (e.g., a router, a gateway, a repeater, a modem, a load balancer, or the like). A machine may be a physical machine or a virtual machine (VM). When discussing the various embodiments, the term "physical address" may refer to an identifier that uniquely identifies a machine (e.g., a computing device). A physical address for a specific machine may include, but is not limited to a media access control (MAC) address of the particular machine. Note that a physical address may be a physical address for a VM. A physical address for a machine may be conserved across the machine's lifetime. Thus, a physical address for a VM may be an identifier that uniquely identifies the VM across the lifetime of the VM (or a physical address for a physical machine across the lifetime of the physical machine). The concept of a physical address may be distinguished from an internet-protocol (IP) address, in that the term "IP address" may refer to an address (or identifier of the address) of a machine's logical location on communication network (e.g., the Internet). Thus, a physical address identifies a particular machine, while an IP address is a logical address that identifies a logical location of a machine's connection to a communication network. Thus, when connected to a communication network, a machine may be associated with both a physical address and an IP address. IP addresses may be dynamic, depending on the machine's connectivity to communication network, while the physical address may be static as the machine's connection to a network varies. For example, if the machine is disconnected and re-connected to a different communication network (or a different logical location on the same communication network), the machine's IP address may be updated, while the machine's physical address remains constant. Note that a single machine may by concurrently connected to more than one communication network and/or can be found at more than one logical location on a single communication network. Thus, a single machine may be associated with more than one active IP address at any one time.

A "DNR request" or "DNR query" may be a request, originating at a "source machine" and provided to a domain name system (DNS) server. The DNR request may encode a domain name and be a request for an IP address associated with at least one machine logically located within a subnetwork (of the larger communication network) associated with the domain name. The DNS server may serve the DNR request by looking up, or otherwise fetching the IP address for a machine within the domain name. The machine which is associated with the looked-up and/or fetched IP address may be referred to as the "target machine." The DNS server may provide the IP address associated with the target machine to the source machine (or another machine that is enabled to forward communication data from the source machine to the target machine). By employing the target machine's IP address, the source machine (or the other machine enabled to forward the source machine's communication data) may forward communication data to the target machine. In this way, a DNS server may be said to re-direct the source machine's communication data to the target machine.

Network traffic (NT) data may refer to any data that encodes one or more transmissions of data packets across a communication network. NT data may encode a set of domain name resolution (DNR) transactions. In some embodiments, the set of DNR transactions may include a plurality of DNR transactions. The term "DNR transaction" may refer to a communication network transaction (e.g., a transmission of one or more data packets) where a source machine provides a DNR request (or DNR query) to a DNS server. As discussed above, the DNR request encodes a domain name. The DNS server identifies an IP address for a target machine associated with the domain name. Thus, a particular DNR transaction involves at least a source machine, a DNS server, and a target machine. In many DNR transactions (but not all), the target machine may be a web server logically located within a sub-network associated with the domain name and the source machine may be an internet user's machine (e.g., a web client). As noted above, a particular DNR transaction may involve more than one DNS server if the initially contacted DNS server cannot resolve the domain name for the user.

Thus, NT data encoding a DNR transaction may encode at least an IP address for the transaction's responding DNS server (e.g., a "DNS IP address") and an IP address for the transaction's target machine (e.g., a "target IP address"). The DNR data may include the DNS IP address for each DNS server invoked in responding to the DNR request. DNR transaction data (as an element of NT data) may be encoded in one or more DNR transaction data structures. The DNR transaction data structure may encode at least the one or more DNS IP addresses and the target IP address for each DNR transaction. In some embodiments, each DNR transaction may be encoded in a separate DNR transaction data structure. In various embodiments, an IP address for the transaction's source machine (e.g., a "source IP address") may be encoded in the transaction's DNR transaction data. In at least one embodiment, the DNR transaction data for a DNR transaction may encode at least one of a physical address for the transaction's source machine (e.g., a "source physical address"), a physical address for the transaction's DNS server (e.g., a "DNS physical address"), and/or a physical address for the transaction's target machine (e.g., a "target physical address"). Unless stated otherwise, when discussing the various embodiments, the qualifying term "IP" for an address may be omitted but inferred, and thus the terms "DNS address," "source address," and "target address" may refer to a DNS IP address, a source IP address, and a target IP address respectively. Thus, NT data and the DNR transaction data encoded in the NT data may be associated with a set of addresses that includes a set of DNS IP addresses (and a corresponding set of DNS servers and/or a set of DNS physical addresses), a set of source IP addresses (and a corresponding set of source machines and/or a set of source physical addresses), and a set of target IP addresses (and a corresponding set of target machines and/or a set of target physical addresses). The set of DNS addresses may include a plurality of DNS addresses. The set of source IP addresses may include a plurality of IP addresses. The set of target addresses may include a plurality of target addresses.

Generally, unless a user (or a machine that they have direct access to) has prior knowledge of a specific machine (and its associated specific internet protocol (IP) address) in which they wish to communicate with, the user must rely on the trustworthiness of the Domain Name System (DNS), as implemented via the modern Internet. Furthermore, the user must assume that their prior knowledge of the specific machine's IP address in not compromised, e.g., the user must assume that the particular IP address has not been spoofed or a malicious user has not overtaken the operability of the specific machine located at the specific IP address. That is, for internet usage, a typical user must trust the integrity of DNS servers, the other machines that the DNS servers act to redirect traffic to (e.g., web servers), and the communication channels between the user's machine, the DNS servers, and the other machines. That is, a user must assume that no portion of the DNS, which is relevant to their network-enabled communications, has not been compromised.

Malicious actors are becoming increasingly sophisticated in their abilities to spoof a trusted DNS server, take over the operability of a trusted DNS server, spoof/take over web servers, and/or otherwise compromise the communication channels between the various machines involved in the communication functionalities that the DNS enables. More succinctly, malicious actors are increasingly becoming competent in compromising the trustworthiness of the DNS. In one non-limiting example of a compromised scenario, a malicious actor need only to edit the lookup table employed by a trusted DNS server. By maliciously mapping a trusted domain name to an IP address associated with a machine that the malicious actor controls, the malicious user may acquire any sensitive information that other users may transmit over the Internet (e.g., user credentials, banking/financial/cryptocurrency account identifiers, HIPPA-protected data, proprietary and/or confidential corporate information, legally-privileged information, and the like). Note that the malicious user may similarly gain access to such sensitive information by forging/spoofing DNS domain resolution queries or responses within the communication channels, previously trusted DNS servers, or previously trusted web servers. As noted above, to use the Internet to communicate such sensitive information, the user must rely on an uncompromised DNS, while the DNS is increasingly vulnerable to attack by malicious actors, some of whom may now be state sponsored.

To such ends, the embodiments herein are directed towards the detection and/or identification of potentially compromised network assets (e.g., DNS servers, web servers, associated IP addresses, communication channels between the machines/addresses, and the like) required for the functionality of a secure DNS. In the embodiments, when a user's communication relies on a network asset that is suspected to be a compromised asset, the user's communication may be re-routed around the potentially compromised asset, the communication may be halted, and/or an indication (e.g., a warning or an alert) of the potentially compromised asset may be provided to the user. As such, the embodiments are directed towards increasing the security and integrity of communications networks, as well as the security and integrity of the machines that employ the communication networks. Increased security and integrity of communication networks and associated machines improves the public's confidence and reliance on such technologies, benefitting the global economy and individual well-being in countless ways.

The embodiments apply graph-theoretic methods on network traffic (NT) data to detect potentially compromised DNS servers, potentially compromised other machines that a DNS server routes traffic towards (e.g., web servers, gateways, routers, and the like), and potentially compromised communication channels between the user's machine (e.g., a client device), the DNS servers, and the other machines. The embodiments use domain name resolution (DNR) transactions encoded in the NT data to generate a graph data structure. The nodes of the graph represent DNS servers and the machines that DNS servers re-direct traffic to, via the DNR transactions. The edges of the graph connect nodes that represent DNS servers and the other machines that the DNS re-directs traffic is to (e.g., web servers), via a DNR transaction. The embodiments analyze the structure of such graphs. This analysis detects signals (e.g., features) in the graph's structure that are indicative of the potential compromise of the represented assets. Detecting such signals or features in the graph's structure serves as a binary classifier for the represented assets. The binary classifier acts to classify each node (and the network asset that the node represents) as non-compromised (e.g., the null-hypothesis of the binary classifier) or compromised (the alternative hypothesis of the binary classifier). Because all classifiers are subject to non-zero error rates for Type I and Type II errors, an asset classified as a compromised asset may be referred to as a suspicious asset, rather than a malicious asset (e.g., because there is a non-zero probability that the particular classification is an example of a false-positive error). Those assets that are consistent with the null-hypothesis may be referred to as trusted assets.

To "learn" which signals or features in a graph structure are indicative of a compromised asset and which signals or features in the graph's structure are indicative of a non-compromised asset, the embodiments employ various machine learning (ML) methods. Some embodiments may be "unsupervised" embodiments, while other embodiments may be "supervised" embodiments. The supervised embodiments employ ground-truth labeled training NT data. The training NT data includes a set of DNR transactions involving both known compromised assets and known uncompromised assets. Because the assets represented by a "training graph" generated from the training DNR transaction data are labeled with ground-truth labels (e.g., "compromised" or "not compromised"), various supervised ML methods may be employed to learn to discriminate between graph features indicative of a compromised asset or graph features indicative of a trustworthy asset. For the unsupervised embodiments, a "historical graph" may be constructed with historical NT data and a "current graph" may be constructed from current NT data. In the unsupervised embodiments, the historical NT data nor the current NT data need be labeled with ground-truths for the assets. Rather, an unsupervised analysis that compares the structure of the current graph to the structure the historical graph is employed to learn which signals or features in the current graph's structure are indicative of compromised assets, and which signals or features are indicative of non-compromised assets, as compared to the historical graph.

When discussing the various embodiments, rather than identifying specific machines (e.g., specific DNS servers and target machines) as being compromised (e.g., suspicious machines) or non-compromised (e.g., trustworthy machines), their associated IP addresses may be identified. Because each machine connected to a communication network (e.g., the Internet) is assigned at least one unique IP address, the IP addresses associated with the compromised/non-compromised machines may be classified as compromised/suspicious or non-compromised/trustworthy IP address. Classifying the associated IP address, rather than the associated machine, may account for scenarios where a malicious actor may have spoofed or mimicked a trusted IP address, rather than attacking a specific machine. In at least one embodiment, in addition to (or in the alternative to) classifying an IP address as suspicious or trustworthy, the associated specific machine may be classified as suspicious or trustworthy, via the machine's physical address. In some embodiments, a machine logically located at and/or associated with a suspicious IP address may additionally be classified as a suspicious machine and a machine logically located at a trustworthy IP address may be classified as a trustworthy machine.

In both supervised and unsupervised embodiments, NT data may be accessed (or provided) that encodes a set (e.g., a plurality of) of DNR transactions associated with a set (e.g., a plurality) of DNS IP addresses (e.g., a set of DNS addresses) and a set (e.g., a plurality) of target IP addresses (e.g., a set of target addresses). The set of DNS addresses may correspond to a set of DNS servers invoked in the DNR transactions of the set of DNR transactions and the set of target addresses corresponds to a set of target machines that were "looked-up" when responding to the DNR requests of the set of DNR transactions. The NT data is employed to generate a graph data structure that includes a set (e.g., a plurality) of nodes and a set (e.g., a plurality) of edges. The set of nodes includes a first subset of the set of nodes and a second subset of the set of nodes that is disjoint from the first subset of nodes. There may be a one-to-one correspondence between the DNS addresses of the set of DNS addresses and the nodes of the first subset of nodes. Each node of the first subset of nodes represents one of the DNS addresses of the set of DNS addresses (and the DNS server of the set of DNS servers that is associated with the DNS address). Accordingly, nodes of the first subset of nodes may be referred to as DNS nodes and the first subset of nodes may be referred to as a set of DNS nodes. There may be a one-to-one correspondence between the target addresses of the set of target addresses and the nodes of the second subset of nodes. Each node of the second subset of nodes represents one of the target addresses of the set of target addresses (and the target machine of the set of target machines that is associated with the target address). Accordingly, nodes of the second subset of nodes may be referred to as target nodes and the second subset of nodes may be referred to as a set of target nodes.

It is noted that the DNS servers of the set of DNS servers and the target machines of the set of target machines need not be co-located, but can be distributed across the globe. Any particular DNS server of the set of DNS servers may be remotely located, with respect to any other DNS server of the set of DNS servers and/or with respect to any target machine of the set of target machines. Likewise, any particular target machine of the set of target machines may be remotely located, with respect to any DNS server of the set of DNS servers and/or with respect to any other target machine of the set of target machines. Even target machines associated with a common domain name need not be co-located, but rather may be distributed across the globe. For instance, each target machine of a set of three target machines may be associated with the particular domain name. Each of the target machines associated with the particular domain name may be physically located in a separate location. In one non-limiting embodiment, a first target machine (of the three associated target machines) may be physically located somewhere on the North American continent. A second target machine (of the three associated target machines) may be physically located somewhere on the European continent. A third target machine (of the three associated target machines) may be physically located somewhere on the Asian continent.

Each edge of the set of edges of the graph may connect one node of the first subset of nodes (e.g., a DNS node of the set of DNS nodes) to a node of the second subset of nodes (a target node from the set of target nodes). That is, each node of the graph connects a DNS node (representing a DNS address and/or DNS server) to a target node (representing a target address and/or a target machine, such as but not limited to a web server). Thus, the graph may be a bipartite graph, where the first part of the bipartite graph corresponds to the DNS nodes (e.g., corresponding to DNS addresses and/or DNS server machines) and the second part of the bipartite graph corresponds to the target nodes (e.g., corresponding to web addresses and/or web server machines).

The generation of the edges is based on the set of DNR transactions encoded in the NT data as follows. In the graph, a pair of nodes is connected by an edge of the set of edges if-and-only-if (iff) the nodes of the node pair simultaneously satisfy two criteria. The first of the two criteria requires that the pair of nodes includes a first node that is included in the first subset of nodes (e.g., a DNS node) and a second node that is included in the second subset of nodes (e.g., a target node). The second of the two criteria requires that at least one DNR transaction in the set of DNR transactions couples the DNS address and the target address represented by the first and second nodes of the node pair, respectively. That is, the second criteria requires at least one DNR transaction where the DNS server associated with the DNS address represented by the DNS node of the node pair responded to the DNR request (of the transaction) by providing the target address represented by the target node of the node pair. That is, a necessary and sufficient condition for a node pair to be connected by an edge in the graph is that (1) the node pair includes a single DNS node and a single target node, where (2) the DNS address (represented by the DNS node) and the target address (represented by the target node) are associated via at least one DNR transaction of the set of DNR transactions. In at least one embodiment, if a node in the graph (either from DNS nodes or from the target nodes) is not connected to at least one other node in the graph (e.g., an isolated node), the isolated node may be removed from the graph.

Based on the structure of the graph, one or more scores are assigned to each node in the graph. In some embodiments, one or more scores are assigned to a particular node based on each of the other nodes of the graph that the particular node is connected to via an edge of the graph. In some embodiments, a "risk score" may be assigned to each node, where a larger risk score is indicative of an increase in a risk (or a decrease in the "trustworthiness") of the IP address (or the machine) represented by the node. In some embodiments, a risk score may be referred to as a "reputation score." Upon assigning the risks scores, the nodes may be ranked based on the assigned scores. Let N and n be positive integers, where N indicates the total number of nodes in the graph and N≥n≥1. Then highest ranking nodes of the set of ranked nodes may be classified as "suspicious nodes" and the corresponding IP addresses (or the machines) represented by the suspicious nodes may be classified as suspicious IP addresses (or suspicious machines). The remaining N—n nodes may be classified "trustworthy nodes" and the corresponding IP addresses (or the machines) represented by the trustworthy nodes may be classified as trustworthy IP addresses (or trustworthy machines).

After the IP addresses and/or machines have been classified as either trustworthy or suspicious, an attempt may be undertaken to quarantine the machines located at the suspicious IP addresses. For example, when a user initiates a DNR transaction that involves a suspicious IP address (or suspicious machine), the user's communication may be re-routed around suspicious IP address, the communication may be automatically halted/terminated, and/or an indication (e.g., a warning or an alert) of the suspicious IP address/machine may be provided to the user. Such a warning and/or alert may enable the user to halt or terminate any communication with the suspicious IP address/machine.

For the unsupervised embodiments, the risk scores may be computed by employing a graph-community detection algorithm. A community risk score is assigned to each community of the graph. A particular node's risk score is based on the community risk score of each community that the particular node is a member of. In some unsupervised embodiments, the particular node's risk score may be further based on network traffic associated with the node's IP address and the network traffic associated with the other nodes of the graph. Some supervised embodiments employ a vector embedding algorithm that is enabled to embed a node in a deeply learned vector space. The risk score for a node is based on its vector embedding, as well as the vector embedding of nodes labeled with a ground-truth of compromised. Other supervised embodiments employ a belief propagation algorithm to determine a node's risk score. Having briefly described an overview of aspects of the present disclosure, various terms used throughout this description are provided.

In addition to suspicious DNS IP addresses and suspicious target IP addresses, a domain name (e.g., or simply a domain) may be classified as a suspicious domain name. For example, if one or more target machines and/or target IP addresses associated with the domain name has been classified as a suspicious target machine and/or suspicious target IP address, then the domain name may be classified as a suspicious domain name. Malicious actors may more frequently attack web servers (e.g., a target machine) associated with more popular domains than less popular domains. Thus, the embodiments may classify domain names, which are associated with suspicious web servers, as suspicious domain names. If a suspicious domain name is associated with DNR transaction, an intervention may be performed, rather than forwarding data packets to a web server associated with the suspicious domain name.

Overview of Environments for Detecting Security Threats to a Domain Name System

Aspects of the technical solution can be described by way of examples and with reference to FIG. 1 and additional illustrations below. FIG. 1 illustrates a block diagram showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and communication network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, a local area network (LAN) and/or a wide area networks (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 8 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100; data structures 120, 140, and 160 described in connection to system 200 described in connection to FIG. 2. Data sources 104a and 104b through 104n may be discrete from user devices 102a and 102b through 102n and server 106 or may be incorporated and/or integrated into at least one of those components. In one embodiment, of data sources 104a through 104n comprise sensors 103a, 107, which may be integrated into or associated with the user device(s) 102a, 102b, or 102n or server 106. Examples of sensed user data made available by data sources 104a through 104n may include events.

Figure 2:
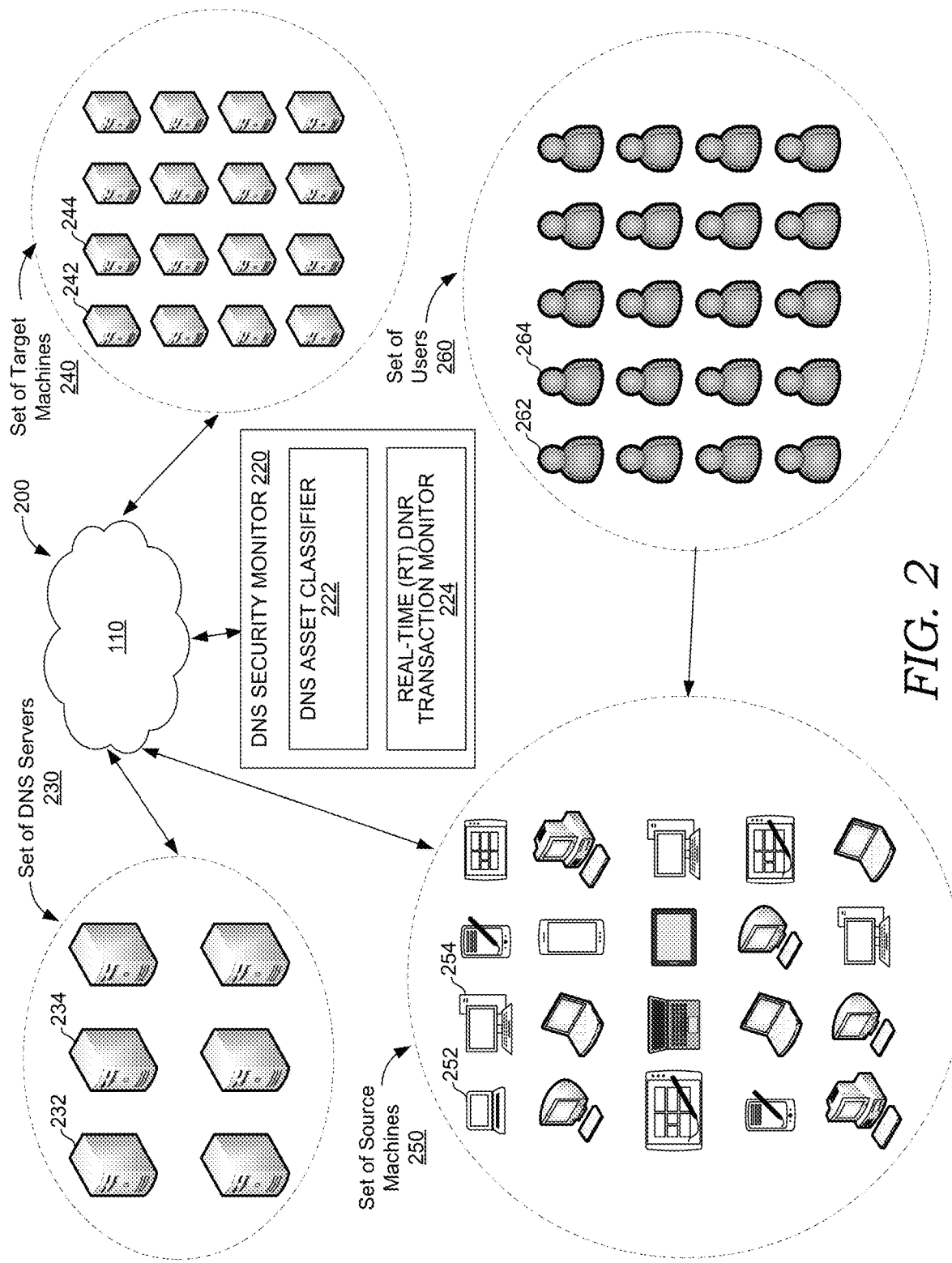
FIG. 2 illustrates a block diagram showing an example DNS security system in which some embodiments of the present disclosure may be employed.

Operating environment 100 can be utilized to implement a component of the components of enhanced Domain Name System (DNS) security system 200, described in FIG. 2, including components for automatically detecting and identifying events or issues related to potentially compromised security or integrity of the Internet's DNS. Operating environment 100 also can be utilized for implementing aspects of process flows 400, 500, 600, and 700 described in conjunction with FIGS. 4-7.

Overview of Example Domain Name Security System

FIG. 2 illustrates a block diagram showing an example domain name system (DNS) security system 200 in which some embodiments of the present disclosure may be employed. System 200 may be implemented via one or more components of environment 100 of FIG. 1. Security system 200 may include a set of DNS servers 230, a set of source machines 250, and a set of target machines 240. The set of DNS servers 230 may be a set of DNS machines (or computing devices) and include at least a first DNS server 232 and a second DNS server 234. The set of target machines 240 may be a set of target computing devices and include a first target machine 242 and a second target machine 244. The set of source machines 250 may be a set of source computing devices and include a first source machine 252 and a second source machine 254. Each machine in the set of DNS servers 230, each machine in the set of source machines 250, and each machine in the set of target machines 240 may be communicatively coupled via communication network 110, as discussed in conjunction with FIG. 1.

It is noted that the DNS servers of the set of DNS servers 230 and the target machines of the set of target machines 240 need not be co-located, but can be distributed across the globe. Any particular DNS server of the set of DNS servers 230 may be remotely located, with respect to any other DNS server of the set of DNS servers 230 and/or with respect to any target machine of the set of target machines 240. Likewise, any particular target machine of the set of target machines 240 may be remotely located, with respect to any DNS server of the set of DNS servers 230 and/or with respect to any other target machine of the set of target machines 240. Even target machines associated with a common domain name need not be co-located, but rather may be distributed across the globe. For instance, each target machine of a set of three target machines may be associated with the particular domain name. Each of the target machines associated with the particular domain name may be physically located in a separate location. In one non-limiting embodiment, a first target machine (of the three associated target machines) may be physically located somewhere on the North American continent. A second target machine (of the three associated target machines) may be physically located somewhere on the European continent. A third target machine (of the three associated target machines) may be physically located somewhere on the Asian continent.

As such, each machine in the set of DNS servers 230, each machine in the set of target machines 240, and each machine of the set of source machines may have an associated logical address (e.g., an internet protocol (IP) address) and a physical address (e.g., a media access control (MAC) address). Each user of a set of users 260 may employ one or more source machines of the set of source machines 250 to communicate with one or more DNS servers of the set of DNS servers 230 and/or one or more target machines of the set of target machines 240 via the communication network 110. Thus, system 200 may include at least a portion of the Internet.

More particularly, the IP address of each target machine may be logically located within one or more domains of a set of domain names. Thus, the set of target machines may be subdivided into a plurality of subsets of the set of target machines 240. Each subset of target machines may be associated with one of the domains in the set of domain names. Each target machine in a subset of machines may have an IP address corresponding to the domain name that is associated with the subset of target machines. At least some of the target machines may be web servers (e.g., a server machine that hosts a webpage for the domain name associated with its corresponding subset of target machines). For example, the first target machine 242 may be a web server for a first domain name and host a first webpage for the first domain. The second target machine 244 may be a web server for a second domain name and host a second webpage for the second domain.

A first user 262 of the set of users 260 may employ the first source machine 252 to view content of the first webpage (associated with the first domain name and hosted by the first target machine 242) by initiating a first domain name resolution (DNR) transaction with the first DNS server 232. A second user 264 of the set of users 260 may employ the second source machine 254 to view content of the second webpage (associated with the second domain name and hosted by the second target machine 244) by initiating a second DNR transaction with the second DNS server 234. Embodiments of DNR transactions are discussed elsewhere herein. However, briefly, in the first DNR transactions, the first DNS server 232 may resolve the first domain name (for the first source machine 252 and/or for the first user 262) by looking up and providing a first IP address of the first target machine 242. For the second DNR transaction, the second DNS server 234 may resolve the second domain name (for the second source machine 254 and/or for the second user 264) by looking up and providing a second IP address for the second target machine 244. Thus, system 200 include a DNS for the Internet.

System 200 includes a DNS security monitor 220. DNS security monitor 220 may implement any of the DNS security embodiments discussed herein. Various components and functionalities of the DNS security monitor 220 are discussed in conjunction with DNS security monitor 300 of FIG. 3. However, briefly here, DNS security monitor 220 is generally responsible for monitoring the security of the DNS included in system 200. That is, DNS security monitor 220 detects untrustworthy assets of the DNS. A DNS asset may include any of the DNS servers of the set of DNS servers 230, any of the target machines of the set of target machines 240, and/or any of the communication channels between any of the source machines of the set of source machines 250 and any of the DNS servers and/or any of the target machines. As noted throughout, an untrustworthy asset may be referred to as a suspicious asset and a trustworthy asset may be referred to as non-suspicious asset. DNS security monitor 220 is also responsible for performing one or more security interventions when a security threat is detected (e.g., the detection of an untrustworthy or suspicious asset).

To perform these dual responsibilities, the DNS security monitor 220 may include a DNS asset classifier 222 and a real-time (RT) DNR transaction monitor 224. DNS asset classifier 222 is generally responsible for classifying each DNS asset as a trustworthy or a non-trustworthy asset. To classify DNS assets, the DNS asset classifier 222 aggregates and analyzes the aggregated network traffic (NT) data (e.g., data packets transmitted by communication network 110) that encode DNR transactions. For reference, the DNS security monitor 220 stores the IP address (and may store the physical address) of each known untrustworthy asset. The RT DNR transaction monitor 224 monitors DNS transaction data, in real-time. If a particular DNR transaction involves an untrustworthy asset (as determined via the DNS security monitor's 220 records of known untrustworthy assets), the RT DNR transaction monitor 224 may invoke, in real-time, one or more security interventions to mitigate any security issues that may emerge from interacting with the untrustworthy asset.

Generally speaking, DNS security monitor 220 intercepts at least portions of the NT data of the communication network 110. The intercepted portion of the NT data encodes various DNR transactions involving the set of source machines 250, the set of DNS servers 230, and the set of target machines 240. If the originator and/or destination of the intercepted data packets does not include a compromised (e.g., suspicious) DNS server and/or target machine, the DNS security monitor 220 may relay the data packet to its intended destination. If the originator and/or destination of the intercepted data packets does include a compromised DNS server and/or target machine, the DNS security monitor 220 may invoke one or more security-related interventions. Thus, DNS security monitor 220 may isolate and/or quarantine security threats to the DNS of system 200.

The operations of the DNS security monitor 220 may include the DNS asset classifier 222 aggregating the DNR transactions and identifying (e.g., classifying) suspicious (e.g., potentially compromised) DNS servers, suspicious target machines, and suspicious communications channels between the DNS servers and the target machines based on the aggregated DNR transaction data. The DNR transaction monitor 224 actively monitors DNR transaction data in real time. When the DNR transaction monitor 224 detects a suspicious DNS server, a suspicious target machine, and/or a suspicious domain name involved in (or associated with) a particular DNR transaction, the DNS security monitor 220 may actively intervene prior to relaying the intercepted data packets to and/or from the potentially compromised network asset. For example, the user's communication may be re-routed around the potentially compromised asset, the communication may be halted, and/or an indication (e.g., a warning or an alert) of the potentially compromised asset may be provided to the user. As such, the DNS security monitor 220 acts to increase the security and integrity of the DNS of system 200.

More specifically, the DNS asset classifier aggregates and stores the NT data and extracts a set of DNR transactions encoded in the NT data that are associated with the set of source machines 250 (and hence the set of users 260), the set of DNS servers 230, and the set of target machines 240. The DNS asset classifier 222 applies graph-theoretic methods on the set of DNR transactions to detect suspicious DNS servers of the set of DNS servers 230, suspicious target machines of the set of target machines 240, and/or suspicious communication channels between the DNS servers and the target machines.

The DNS asset classifier 222 employs the set of DNR transactions to generate a graph data structure. The graph data structure encodes a mathematical graph object that includes a set of nodes and a set of edges connecting the nodes of the set of nodes. The nodes of the graph represent DNS servers of the set of DNS servers 230 and the target machines of the set of target machines 240. The edges of the graph connect nodes that represent DNS servers to nodes that represent target machines that are connected via at least one DNR transaction of the set of DNR transaction. That is, each edge of the graph connects a represented DNS server to a represented target machine that is connected to the represented DNS server by at least one DNR transaction of the set of DNR transactions. Thus, the graph encoded in the graph data structure may be a bipartite graph. The first part of the bipartite graph includes a first subset of the set of nodes that represent the DNS servers of the set of DNS servers 230. The second part of the bipartite graph includes a second subset of the set of nodes that represents the target machines of the set of target machines 240. The DNS asset classifier 222 analyzes the structure of such graphs. This analysis detects signals (e.g., features) in the graph's structure that are indicative of the potential compromise of the represented assets. Detecting such signals or features in the graph's structure serves as a binary classifier for the represented assets. The binary classifier acts to classify each node (and the DNS server or target machine that the node represents) as non-compromised (e.g., the null-hypothesis of the binary classifier) or compromised (the alternative hypothesis of the binary classifier). The signals or features in such graphs that signify a suspicious asset may be learned via various machine learning (ML) methods. In some embodiments, unsupervised ML methods may be employed to learn such signals and/or features. In other embodiments, such signals and/or features may be learned via supervised ML methods. The DNS security monitor 220 stores or records the IP address (and perhaps the physical address) of each suspicious DNS server and each suspicious target machine.

To protect each of the source machines from communicating with a suspicious DNS server and/or a suspicious target machine, the RT DNR transaction monitor 224 may intercept at least a portion of the data packets transmitted to and/or from each source machine. For instance, the DNR transactions monitor 224 may intercept those data packets encoding a DNR query and those data packets encoding a response to the DNR query. In some embodiments, the DNR transaction monitor 224 may intercept DNR transaction-related data packets to and/or from a source machine. In some embodiments, the DNR transaction monitor 224 may intercept data packets encoding a DNR query, originating at a source machine that have an intended destination of a particular DNS server. In these embodiments, the DNR transaction monitor 224 may intercept such data packets in their transit from a source machine to the intended DNS server. In these embodiments, the DNR transaction monitor 224 may additionally intercept packets originating at a DNS server that are transmitted to the source machine (e.g., packets answering a DNR query with an IP address for a target machine). That is, the DNR transaction monitor 224 may intercept data packets, prior to their delivery to the intended machine, encoding DNR queries and data packets encoding responses to DNR queries. If the intended destination and/or originator of the intercepted data packets is a known suspicious machine (or a known suspicious IP address and/or a known suspicious domain name), then the DNR transaction monitor 224 may perform one or more security interventions prior to relaying the data packets to the intended destination. In some embodiments, the one or more security interventions may include not relaying the intercepted data packets to the intended destination.

For example, when a new DNR transaction is initiated by a source machine that sends a DNR request to an intended DNS server, the DNR transaction monitor 224 may intercept the DNR request prior to its delivery to the intended DNS server. If the intended DNS server is a suspicious DNS server, then the DNR transaction monitor 224 may detect it as such (via the DNS security monitor 220 storing the known suspicious IP addresses) and initiate one or more security interventions, which may include not forwarding the DNR query to the suspicious DNS server (or take an alternative intervention). If the DNS server is not known to be a suspicious DNS server, then the DNR transaction monitor 224 may relay the DNR query to the intended DNS server. The DNS server may resolve the domain name included in the DNR query by sending an associated IP address of the intended target machine back to the source machine (e.g., transmitting a response to the DNR query to the originating source machine). Again, the DNR transaction monitor 224 may intercept the one or more data packets with the payload encoding target machine's IP address and/or the associated domain name. If the target machine is a known target machine that has been classified as a suspicious target machine (or its IP address is a suspicious IP address), then the DNR transaction monitor 224 may not relay (or forward) the target machine's suspicious IP address to the source machine (or may take an alternative intervention). If the target machine (or the associated domain name) is not known to be a suspicious target machine (or a suspicious domain name), then the DNR transaction monitor 224 may relay the target machine's IP address to the source machine.

Figure 3:
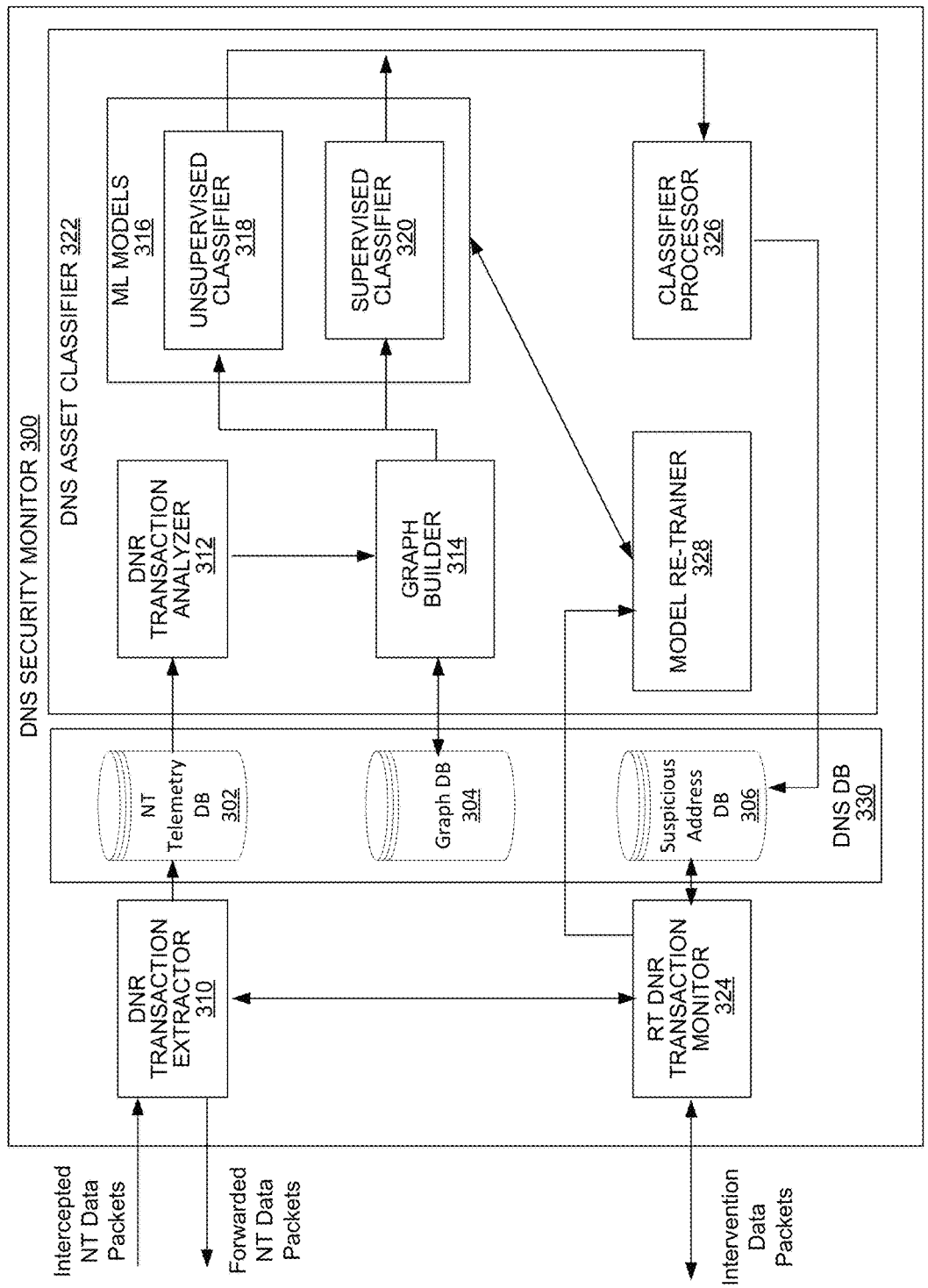
FIG. 3 illustrates a block diagram showing an example DNS security monitor in which some embodiments of the present disclosure may be implemented.

FIG. 3 illustrates a block diagram showing an example domain name system (DNS) security monitor 300 in which some embodiments of the present disclosure may be implemented. DNS security monitor 300 may be similar to and/or include similar functionality and/or structure of DNS security monitor 220 of FIG. 2. As such, DNS security monitor 300 may include a DNS asset classifier 322 and a RT DNR transaction monitor 324. DNS asset classifier 322 may include similar functionality and/or structure to DNS asset classifier 222 of FIG. 2. Likewise, RT DNR transaction monitor 324 may include similar functionality and/or structure to RT DNR transaction monitor 224 of FIG. 2. DNS security monitor 300 may additionally and/or alternatively include a DNR transaction extractor 310 and a DNS database (DB) 330. DNS security monitor 220 of FIG. 2 may further include a DNR transaction extraction that is similar to DNR transaction extractor 310 and a DNS DB, and neither of which are shown in FIG. 2.

In some embodiments, the functionality of the DNS security monitor 300 may be provided as a web-based and/or cloud-based service to clients. At least a portion of the functionality of the DNS security monitor 300 may be provided locally and/or implemented by a client's computer device, e.g., a source machine included in the set of source machines 250 of FIG. 2. For instance, the source machine may have access to at least a portion of suspicious address DB 306 (e.g., see below for a detailed discussion of suspicious address DB 306). In at least one embodiment, at least a portion of the suspicious address DB 306 may be stored on a client's source machine. In such embodiments, the copy of the suspicious address DB 306 may be consulted prior to initiating a DNR request, e.g., prior to sending the request to a DNS server. If the DNR request is associated with a known suspicious domain name, a suspicious DNS address, and/or a suspicious target address, then an intervention may be performed without even transmitting the DNR request to the DNS server. Likewise, a local copy of the suspicious address DB 306 may be consulted when the DNS returns the requested target address. The source machine may perform one or more interventions without the requirement of running a remote DNS security monitor 300, e.g., at least a portion of the functionality of the DNS security monitor is implanted at the source machine. In at least one embodiment, a web browser that the client is employing to access one or more target machines may provide the functionality of the DNS security monitor 300. The web browser may be running locally on the source machine. For example, at least portions of the DNS security monitor 300 may be implemented by a web browser and/or and web browser extension and/or a web browser "add on."

As shown in FIG. 3, the DNS DB 330 may include at least one of a NT telemetry DB 302, a graph DB 304, and/or a suspicious address DB 306. The NT telemetry DB 302 may store NT data encoding at least DNR transactions. In some embodiments, the NT telemetry DB 302 may store additional NT data. The graph DB 304 may store graph data structures encoding mathematical graph data structure objects. The suspicious address DB 306 may store the suspicious IP address for DNS assets that have been classified as suspicious or untrustworthy. The suspicious address DB 306 may additionally store the associated physical addresses for the untrustworthy machines. In some embodiments, the suspicious address DB may additionally store the logical and/or physical addresses of machines that are known and/or classified as trustworthy or non-suspicious.

In addition to suspicious DNS IP addresses and suspicious target IP addresses, a domain name (e.g., or simply a domain) may be classified as a suspicious domain name. For example, if one or more target machines and/or target IP addresses associated with the domain name has been classified as a suspicious target machine and/or suspicious target IP address, then the domain name may be classified as a suspicious domain name. Malicious actors may more frequently attack web servers (e.g., a target machine) associated with more popular domains than less popular domains. Thus, the embodiments may classify domain names, which are associated with suspicious web servers, as suspicious domain names. If a suspicious domain name is associated with DNR transaction, an intervention may be performed, rather than forwarding data packets to a web server associated with the suspicious domain name. Thus, the suspicious address DB 306 may store the names of domain names that have been classified as suspicious domains.

DNS security monitor 300 may generally monitor one or more streams of NT data, communicated via network 110 of FIGS. 1-2. That is, one or more streams of NT data packets (transmitted by communication network 110) may be received by the DNR transaction extractor 310. For any given transmitted data packet, the DNS security monitor 300 may be situated, in the corresponding communication channel, between the packet's originating machine and the packet's intended destination machine. By receiving the NT data stream within the communication channel, the DNR transaction extractor 310 may act to intercept (and relay) NT data packets transmitted via communication network 110 of FIGS. 1-2. The data packets may be intercepted while in transit, where the data packets originated at an originating machine (e.g., a source machine of the set of source machines 250 of FIG. 2) with an intended destination machine (e.g., a DNS server of the set of DNS servers 230 of FIG. 2). The DNR transaction extractor 310 may also act to intercept NT data packets, in transit, originating at a DNS server with an intended destination machine that is a source machine of the set of source machines 250. In some embodiments, the DNR transaction extractor 310 may intercept data packets in transit between source machines (or the DNS servers) and target machines of the set of target machines 240 of FIG. 2.

The DNR transaction extractor 310 may analyze the data encoded in the intercepted packets to determine whether the data packets are associated with a DNR transaction. If the intercepted packets are not associated with a DNR transaction, the data packets may be relayed or forwarded to their intended destination, without further analysis. In some embodiments, DNS security monitor 300 may be enabled to only intercept data packets that are part of a DNR transactions. If the intercepted packets are associated with a DNR transaction, the DNR transaction extractor 310 may extract those data packets and store at least a portion of them in the NT telemetry DB 302. The DNR transaction extractor 310 may further forward those DNR transaction data packets to the RT DNR transaction monitor 324. As discussed throughout, depending on whether the DNR transaction data packets involve a suspicious DNR asset (e.g., a suspicious DNS IP address, a suspicious target IP address, and/or a suspicious domain name) the RT DNR transaction monitor 324 may perform one or more interventions and/or relay the data packets to their intended destination machine.

DNS security monitor 300 may be operated in two modes: a classification mode and/or a real-time monitoring mode. The DNS security monitor 300 may be operated in one of these modes at any particular moment, or in both modes simultaneously. In the classification mode, the DNS asset classifier 322 may employ the DNR transaction data aggregated and stored in the NT telemetry DB 302 to classify known DNS servers and known target machines as suspicious or non-suspicious. The corresponding logical/physical addresses, as well as each address' classification (suspicious or non-suspicious), may be stored in the suspicious address DB 306. During the monitoring mode, DNR transaction extractor 310 may forward, in real time, any DNR transaction-related data packet to the RT DNR transaction monitor 324. The RT DNR transactions monitor 324 may check if the originating machine and/or indented destination machine (or destination domain name) for the data packet is associated with a logical and/or physical addresses (or domain name) that has been classified as suspicious. If the DNR transaction packet involves an address (or domain name) that is classified as suspicious, the DNR transaction monitor 324 may invoke one or more interventions. If the DNR transaction packet does not involve an address that is classified as suspicious, the DNR transaction monitor 324 may relay or forward the DNR transaction packet to its indented destination. In various embodiments, a DNR request and/or a DNR transaction may involve multiple data packets. In such embodiments, the multiple DNR transaction packets may be intercepted and checked for suspicious IP addresses. At least a portion of the DNR transaction monitor's 324 functionality may be implemented locally by the client user's source machine. For instance, portions of the DNS security monitor 300 and/or the RT DNR transaction monitor 324 may be implemented by the source machine's OS, e.g., the OS's network stack. Further details of the functionality of the RT DNR transaction monitor 324 are discussed below.

The components of the DNS asset classifier 322 will now be discussed. The functionality of the components of the DNS asset classifier 322 may be enabled while the DNS security monitor 300 is operated in its classification mode. The DNS security monitor 300 may be operated in its classification mode at periodic intervals (e.g., once a week, once a day, or the like), or from time-to-time on an as-need basis. In some embodiments, the DNS asset classifier may be operated in its classification mode after receiving a predetermined number of new DNS transactions. For example, after receiving a 1000 (or any other appropriate number) of new DNR transactions, the DNS security monitor 300 may be switched to its classification mode to determine the classification of any new DNS assets, or to update prior classification of DNR assets already classified. In some embodiments, the DNS security monitor 300 may be operated in its classification mode in the background (or in parallel) while it is also operated in its real-time monitoring mode.

When the DNS security monitor 300 is operated in its classification mode, the DNS asset classifier 322 operates a classification pipeline, as shown by the arrows in the arrows of FIG. 3. In particular, the DNS asset classifier 322 applies graph-theoretic methods to the aggregated DNR transaction data (stored in NT telemetry DB 302) to detect and/or identify untrustworthy DNS assets (e.g., suspicious DNS servers and/or suspicious target machines). The DNS asset classifier 322 may include a DNR transaction analyzer 312, a graph builder 314, machine learning (ML) models 316, a classifier processor 326, and a model re-trainer 328. The ML models 316 may include an unsupervised classifier 318 and/or a supervised classifier 320. The classification pipeline (or classification workflow) of the DNS asset classifier 322 is approximately shown by the arrows in FIG. 3.

The DNR transaction analyzer 312 is generally responsible for analyzing each of the aggregated DNR transactions stored in the NT telemetry DB 302. For each DNR transaction, DNR transaction analyzer 312 may analyze the DNR transaction data to extract the IP addresses (and physical addresses of the associated machines) of the source machines, the DNS servers, and the target machines, as well as the domain names associated with the DNR transaction data. As shown in the classification pipeline of FIG. 3, the extracted information may be provided to the graph builder 314. The DNR transaction analyzer 312 may provide extracted information for a set of DNR transactions to the graph builder 314. The extracted information may include at least a set of DNS IP addresses (for the set of DNS servers 230 of FIG. 2) and a set of target IP addresses (for the set of target machines 240 of FIG. 2). The extracted information may include encodings of which DNS servers provided which target IP addresses, and for which domain names (e.g., for a DNS request), via the set of DNR transactions. The extracted information may additionally include the physical addresses for the various IP addresses. Thus, the graph builder 314 may receive at least a set of DNS IP addresses, a set of target IP address, and encodings of couplings (or associations) between DNS IP addresses and target IP addresses. The couplings of the DNS IP addresses and the target IP addresses result from a particular DNS server (corresponding to a particular DNS IP address) providing a particular target IP address (for a particular domain name) via at least one DNR transaction of the set of DNR transactions.

The graph builder 314 may generate one or more graph data structures from the received data (or information) that was extracted from the set of DNR transactions. The graph data structure encodes a graph mathematical object that includes a set of nodes and a set of edges. The graph data structure may encode the graph via various data structures, such as but not limited to an adjacency matrix, an adjacency list, or the like. The set of nodes includes a first subset of the set of nodes and a second subset of the set of nodes that is disjoint from the first subset of nodes. There may be a one-to-one correspondence between the DNS addresses of the set of DNS IP addresses and the nodes of the first subset of nodes. Each node of the first subset of nodes represents one of the DNS addresses of the set of DNS IP addresses (and the DNS server of the set of DNS servers 230 that is associated with the DNS address). Accordingly, nodes of the first subset of nodes may be referred to as DNS nodes and the first subset of nodes may be referred to as a set of DNS nodes. There may be a one-to-one correspondence between the target addresses of the set of target IP addresses and the nodes of the second subset of nodes. Each node of the second subset of nodes represents one of the target addresses of the set of target IP addresses (and the target machine of the set of target machines 240 that is associated with the target address). Accordingly, nodes of the second subset of nodes may be referred to as target nodes and the second subset of nodes may be referred to as a set of target nodes.

Each edge of the set of edges of the graph may connect one node of the first subset of nodes (e.g., a DNS node of the set of DNS nodes) to a node of the second subset of nodes (a target node from the set of target nodes). That is, each node of the graph connects a DNS node (representing a DNS address and/or DNS server) to a target node (representing a target address and/or a target machine, such as but not limited to a web server). Thus, the graph may be a bipartite graph, where the first part of the bipartite graph corresponds to the DNS nodes (e.g., corresponding to DNS addresses and/or DNS server machines) and the second part of the bipartite graph corresponds to the target nodes (e.g., corresponding to web addresses and/or web server machines).

Graph builder 314 generates each of the edges of the set of edges based on the couplings of the DNS IP addresses and the target IP addresses as follows. In the graph, a pair of nodes is connected by an edge of the set of edges if-and-only-if (iff) the nodes of the node pair simultaneously satisfy two criteria. The first of the two criteria requires that the pair of nodes includes a first node that is included in the first subset of nodes (e.g., a DNS node) and a second node that is included in the second subset of nodes (e.g., a target node). The second of the two criteria requires that at least one DNR transaction in the set of DNR transactions couples the DNS address and the target address represented by the first and second nodes of the node pair, respectively. That is, the second criteria requires at least one DNR transaction where the DNS server associated with the DNS address represented by the DNS node of the node pair responded to the DNR request (of the transaction) by providing the target address represented by the target node of the node pair. That is, a necessary and sufficient condition for a node pair to be connected by an edge in the graph is that (1) the node pair includes a single DNS node and a single target node, where (2) the DNS address (represented by the DNS node) and the target address (represented by the target node) are associated via at least one DNR transaction of the set of DNR transactions. In at least one embodiment, if a node in the graph (either from DNS nodes or from the target nodes) is not connected to at least one other node in the graph (e.g., an isolated node), the isolated node may be removed from the graph. Graph builder 314 may store the graph data structure in graph DB 304.

One or more graphs generated by graph builder 314 (and/or stored in graph DB 304) are provided to one or more machine learning (ML) models of the ML models 316. As shown in FIG. 3, ML models 316 includes one or more unsupervised classifiers 318 and/or one or more supervised classifiers 320. Details of the unsupervised classifier 318 and the supervised classifier 320 are discussed below. However, briefly here, each of these classifiers 318/320 employs the one or more graph data structures to assign each of the DNS IP addresses (represented by the nodes of the graph) and each of the target IP addresses (represented by the nodes of the graph) one or more risk scores. The risk score assigned to a node may be positively correlated with a "trustworthiness" of the represented IP address. IP addresses with a higher risk score may be associated with a larger probability that the IP address has been compromised (e.g., the corresponding DNS server/target machine is less trustworthy) than those IP addresses represented by nodes with smaller risk scores. In some embodiments, the range of the possible risk score may be within the closed interval [0,1], where nodes with a risk score closer to 1 are "more suspicious" than nodes with a risk score closer to 0. Thus, each of the DNS server and each target machine (corresponding to the IP addresses represented by the nodes) may be assigned a risk score.

The nodes, as well as the represented IP addresses (and the corresponding DNS servers/target machines) may be ranked according to their assigned risk scores. The IP addresses that are assigned higher risk scores may be ranked higher than the IP addresses assigned lower risk scores, e.g., a list of ranked nodes may be generated, where the more suspicious IP addresses are ranked higher than the less suspicious IP addresses. In some embodiments, two ranked lists of IP addresses may be generated: a first list for the DNS addresses and a second list for the target addresses. In other embodiments, a single ranked list of IP addresses, which includes both the DNS IP addresses and the target IP addresses, may be generated.

One or more threshold tests may be applied to the ranked list of IP addresses. Any IP address (and the corresponding DNS server/target machine) that are ranked above a threshold value may be classified as a suspicious IP address. The DNS server/target machines corresponding to a suspicious IP address may be classified as a suspicious DNS server/target machine. Those IP addresses that are ranked below the threshold value may be classified as a non-suspicious or trustworthy IP address. The DNS server/target machines corresponding to a non-suspicious or trustworthy IP address may be classified as a non-suspicious or trustworthy DNS server/target machine.

The one or more threshold tests may be applied separately to the ranked list of DNS IP addresses and the ranked list of target IP addresses. In other embodiments, one or more threshold tests may be applied to the aggregated ranked list that includes both the DNS addresses and the target addresses. A threshold test may include a threshold value that classifies an absolute number of IP addresses as suspicious addresses, e.g., the 10 highest ranked IP addresses are classified as suspicious addresses. In other embodiments, a threshold test may include a threshold value that classifies a relative number of IP addresses as suspicious addresses, e.g., the 5% highest ranked IP addresses are classified as suspicious addresses. In other embodiments, a threshold test may include a threshold value that classifies IP addresses as suspicious addresses based on the value of its risk score, e.g., any IP address represented by a node with a risk score greater than 0.95 is classified as a suspicious IP address. Thus, the ML models 316 may serve as a binary classifier for each DNS server in the set of DNS servers 230 and each target machine in the set of target machines 240.

Acting as a binary classifier, ML models 316 may be prone to Type I errors (e.g., false positive errors) and Type II errors (e.g., false negative errors). As such, the classifications of the DNS assets may be provided to the classifier processor 326. The classifier processor 326 may be generally responsible for applying logic to correct at least a portion of the Type I and Type II errors. At least some of the false positive (FP) errors of the ML models 316 may be corrected in circumstances where an IP address that is known to be trustworthy is misclassified as a suspicious IP address. At least some of the false negative (FN) errors of the ML models 316 may be corrected in circumstances where an IP address that is known to be suspicious is misclassified as a trustworthy IP address. For example, the trustworthiness (or lack thereof) may be known for at least some of the IP addresses via other means, such as but not limited to user feedback, inspection of the machines, verification of the integrity of a lookup table employed a DNS server, verification with a party associated with a domain name of a valid IP address for its target machine, and the like. The classifier processor 326 may correct Type I and Type II errors by applying various logic and/or error detection and correction algorithms to the classifications of the ML models 316. As input for its error detection and correction algorithms, the classifier processor 326 may employ other information that may be available to the DNS security monitor 300.

After detecting and correcting as many classification errors as possible, the classifier processor 326 may store the classifications of the IP addresses/DNS assets in the suspicious address DB 306. An IP address of each DNS server and each target machine, along with its classification of suspicious or trustworthy may be stored in the suspicious address DB 306. The corresponding physical addresses of the DNS servers/target machines may also be stored in suspicious address DB 306. In some embodiments, a domain name associated with the target machines may additionally be stored in suspicious address DB 306.

When operating in real-time monitoring mode, the RT DNR transaction monitor 324 may employ suspicious address DB 306 to determine whether to invoke one or more interventions when it intercepts a DNR transaction-related data packet. As discussed further below, the RT DNR transaction monitor 324 may receive user feedback in response to its interventions. The model re-trainer 328 may employ this feedback (along with other information) to re-train the unsupervised classifier 318 and/or the supervised classifier 320. Various embodiments of the unsupervised classifier 318 and the supervised classifier 320 will now be discussed.

Unsupervised Classifier

The unsupervised classifier 318 may be employed when there have not yet been any identified or detected suspicious IP addresses (or corresponding physical addresses and/or machines), but there has been historical DNR data aggregated in the NT telemetry DB 302. That is, the unsupervised classifier 318 may be employed when relevant training data is unavailable. Such relevant training data may include known IP addresses (for DNS servers and target machines) that are labeled with ground-truth labels (e.g., suspicious or non-suspicious). Rather than relying on training data, the unsupervised classifier 318 may be employed when there is a sufficient volume of historical (and unlabeled) DNR transaction data available. In the various embodiment, at least a portion of the NT data stored in NT telemetry DB 302 may be subdivided into two disjoint subsets: historical NT data and current NT data. Historical NT data may encode a set of historical DNR transactions, while the current NT data may encode a set of current DNR transactions. Each of the historical DNR transactions may have occurred within a first temporal window, while each of the current DNR transactions may have occurred within a second temporal window that has occurred subsequent to the first temporal window.

The first temporal window may be referred to as a historical temporal window and the second temporal window may be referred to as the current temporal window. In various embodiments, the current NT data may be referred to simply as NT data, while the set of current DNR transactions encoded in the NT data may be referred to as simply a set of DNR transactions.

There need not be any overlap (or intersection) between the historical and current temporal windows. For instance, the historical temporal window may include the temporal range $[t_0, t_1]$, while the current temporal window includes the temporal range $[t_1, t_2]$, where $t_0$, $t_1$, and $t_2$ are timestamps with the temporal ordering of: $t_0 < t_1 < t_2$. Any appropriate values for $t_0$, $t_1$, and $t_2$ may be chosen in the current embodiments. For example, the value of $t_2$ may be a current (or relatively recent) point in time, while $t_1 = t_2 - 7$ days, and $t_0 = t_1 - 30$ days, or any other such values. In some embodiments, the historical and current temporal windows may be disjoint temporal windows. For example, if the historical temporal window includes the temporal range $[t_0, t_1]$, then the current temporal window may include the temporal range $[t_2, t_3]$, where $t_0 < t_1 < t_2 < t_3$. Any other such values may be chosen to characterize the historical and current temporal windows. Each historical DNR transaction may be associated with a timestamp falling within the historical temporal window $[t_0, t_1]$, while each current DNR transaction may be associated with a timestamp falling within the current temporal window $[t_1, t_2]$.

In at least some of the unsupervised embodiments enabled by unsupervised classifier 318, the pipeline of the classification mode of DNS security monitor 300 may be, but need not be, performed at the domain level. For example, a first subset of the set of target machines (e.g., the set of target machines 240 of FIG. 2) may be associated with a first domain name and a second subset of the set of target machines, which is disjoint from the first subset of target machines, may be associated with a second domain name. The following discussion of the functionalities of the pipeline may apply to the first subset of target machines associated with the first domain name, while a similar analysis is performed separately for the second subset of target machines associated with the second domain name. In such embodiments, the unsupervised classification pipeline may be parallelized and run for multiple domain names concurrently.

The unsupervised embodiments employ the statistical tendency that suspicious DNS servers/target machines tend to be novel machines. That is, the suspicious IP addresses appear in the current NT data with significantly greater frequency than historical NT data. To employ this statistical trend, the unsupervised embodiments generate two graph data structures for each domain name (of a set of domain names): a historical graph and a current graph. The historical graph data structure is generated from historical DNR transactions, while the current graph data structure is generated from current DNR transactions. Thus, in unsupervised embodiments, the graph builder 314 may generate two separate graphs for each domain name. The two separate graphs include the historical graph and the current graph. The historical graph is based on the historical DNR transactions associated with the domain name. The current graph is based on the current DNR transactions associated with the domain name. Each of the graph data structures for each domain name may be stored in the graph DB 304. The historical graph data structure may be referenced by $G_h$, while the current graph data structure may be referenced by $G_c$. The current graph data structure (or current graph) may be referred to simply as the graph data structure (or the graph). Based on the above mentioned statistical trend, at least some of the nodes in the bipartite current graph may represent suspicious DNS IP addresses and/or suspicious target IP addresses, while other nodes of the current graph represent trustworthy DNS IP addresses and/or suspicious target IP addresses. The nodes of the historical graph represent DNS IP addresses and target IP address, which are assumed to be trustworthy.

The unsupervised classifier 318 may be enabled to detect novel IP addresses in the current graph that are not present in the historical graph based on a comparison between the historical and current graphs. In the unsupervised embodiments, an IP address that is represented by a node in both the historical and current graphs for a domain name may be referred to as a non-novel IP address. In contrast, an IP address that is represented by a node in the current graph, but is not represented by a node in the historical graph may be referred to as a novel IP address. Similarly, nodes in the current graph that represent novel IP addresses may be referred to as novel nodes, while nodes in the current graph that represent non-novel IP addresses may be referred to as non-novel nodes. Thus, the current graph may include a set of non-novel nodes and a set of novel nodes. The non-novel nodes represent a set of non-novel IP addresses and the set of novel nodes represents a set of novel IP addresses. Note that each non-novel node of the current graph may be classified as a non-novel DNS node or a non-novel target node, depending on which type of IP address is represented by the node (a DNS IP address or a target IP address). Likewise, each novel node of the current graph may be classified as a novel DNS node or a novel target node, depending on which type of IP address is represented by the node. In the various embodiments, $d_{non-nov}$ refers to the number of non-novel DNS nodes in the current graph and $d_{nov}$ refers to the number of novel DNS nodes in the graph. Likewise, $t^{non-nov}$ refers to the number of non-novel target nodes in the current graph and $t_{nov}$ refers to the number of novel target nodes in the graph.

The unsupervised classifier 318 may assign a risk score to each node in the current graph, e.g., a risk score may be assigned to each of the novel and non-novel nodes of the current graph. The risk score assigned to a node may be referred to as a node risk score. In some embodiments, because the node represents an IP address, the node risk score may be referred to as an IP risk score and/or may be referenced by the notation: $R_{IP}(IP)$, where the non-subscript IP refers to a reference or index that indicates the IP address represented by the node for which the node risk score is calculated for.

In order to assign a risk score to each node, the unsupervised classifier 318 may be enabled to subdivide the bipartite current graph into a set of multiple communities. Thus, the unsupervised embodiments may be referred to as community detection embodiments. To detect such communities, the unsupervised classifier may employ any community detection algorithm, such as but not limited to the Louvain method. Community detection algorithms that are employable in the unsupervised embodiments include algorithms that attempt to maximize the modularity of a graph, via measurements of the densities of edges within a particular community (e.g., an intra-community edge density), as compared to the density of edges between communities (e.g., an inter-community edge density). Thus, the unsupervised classifier may subdivide the nodes of the current graph into a set of communities: $C = \{C_1, C_2, C_3, \ldots C_\gamma\}$, where $\gamma \geq 2$ is a positive integer that indicates the number of communities in the subdivided bipartite graph. Each community may include novel and non-novel target nodes. In such embodiments, $t_i^{non-novel}$ may indicate the number of non-novel target nodes in the community $C_i$, while $t_i^{nov}$ indicates the number novel target nodes in the ith community. Also, in these embodiments, $d_i^{non-nov}$ refers to the number of non-novel DNS nodes in the current graph that have at least one edge connecting the non-novel DNS node to at least one novel target node of the ith community. Likewise, $d_i^{nov}$ refers to the number of novel DNS nodes in the current graph that have at least one edge connecting the novel DNS node to at least one novel target node of the ith community. Note that any DNR and/or target node of the current graph may belong to more than one community.

The unsupervised classifier 318 may assign a community risk score to each of the $\gamma$ communities. The community risk score for a particular community (e.g., $C_i$, where i is an index for the community) may be referenced by $R_C(C_i)$. The community risk score may be based on at least three factors regarding metrics associated with the community. As noted above, an assessment of novelty for a node is based on comparison between the current graph (and the IP addresses represented therein) and the historical graph (and the IP addresses represented therein). One factor employed to calculate the community risk score for the community $C_i$ may include a target novelty metric, referenced as $w_i$. The value of the target novelty metric for $C_i$ may denote the ratio of the number of novel target IP addresses in the community to the total number of target IP addresses in the community. The target novelty metric for the community may be calculated by the ratio $w_i = t_i^{nov}/(t_i^{nov} + t_i^{non-nov})$.

Another factor employed to calculate the community risk score for the community $C_i$ may include a DNS total metric for the community, referenced as Dr. The value of the DNS total metric for the ith community may indicate the ratio of DNS nodes that have at least edge connected to at least novel target node of the community to the total number of DNS nodes included in the current graph. The DNS total metric may be calculated as follows: $D_i^{tot} = (d_i^{nov} + d_i^{non-nov})/(d_{nov} + d_{non-nov})$. Yet another factor employed to calculate the community risk score for the community $C_i$ may include a DNS novelty metric, referenced as $D_i^{nov}$. The value of the DNS novelty metric for the ith community may indicate the ratio of novel DNS nodes that have at least edge connected to at least novel target node of the community to the number of novel DNS nodes included in the current graph. The DNS novelty metric may be calculated as follows: $D_i^{nov} = (d_i^{nov})/(d^{nov} + d^{non-nov})$.

In various embodiments, the calculation of the community risk score for $C_i$ (i.e., $R_c(C_i)$) may be based on the target novelty metric ($w_i$), the DNS total metric (i.e., $D_i^{tot}$) and the DNS novelty metric (i.e., $D_i^{nov}$). The community risk score may be calculated as follows:

$$R_C(C_i) = \left(\frac{1}{1+e^{-w_i}}\right) \cdot \left(\frac{1}{1+e^{-D_i^{tot}-D_i^{nov}}}\right).$$

The risk score for each DNS node and each target node may be calculated based on the community risk score of each community that the node is a member of In one non-limiting embodiment, a node's risk score (e.g., the IP risk score $R_{IP}(IP)$) may be calculated as follows:

$$R_{IP}(IP) = \sum_i R_C(C_i) \cdot I(IP \in C_i),$$

where I is the indicator function. Note that the summation is performed over the communities and I takes on the value of 1.0 for each community that the corresponding node is a member of and takes the value of 0.0 for each community that the corresponding node is not a member of.

In other embodiments, still additional factors may be employed to refine the calculation of the IP (or node) risk score. For instance, the network traffic (NT) associated with the IP addresses represented by the nodes may be employed. A traffic score for each node (or each represented IP address) may be calculated and referenced as $T_{IP}$, where the subscript IP is employed as an index for the node (or corresponding IP address). The traffic score for the node may be defined as the ratio between the NT traffic associated with the represented DNS or target IP address to the overall NT traffic of the domain. Thus, the NT traffic data stored in the NT telemetry DB 302 may be employed to calculate the traffic score for each node. Nodes associated with greater volumes of NT traffic statistically tend to be more trustworthy than nodes associated with lesser NT traffic volumes. If the traffic score for the nodes is factored into the risk score for the nodes, the risk score may be calculated as follows:

$$R_{IP}(IP) = \left(\frac{1}{1+e^{T_{IP}}}\right) \sum_i R_C(C_i) \cdot I(IP \in C_i).$$

As noted above, the nodes (and represented IP addresses) may be ranked, based on the calculated risk scores. The greater the risk score for a particular node, the greater the node appears in the rankings of the nodes.

Supervised Classifier

The supervised classifier 320 may be employed when one or more suspicious IP addresses (or corresponding physical addresses and/or machines) have already been identified. The known suspicious and non-suspicious addresses may be labeled and employed as ground-truth labeled training data for the supervised embodiments. That is, the supervised classifier 320 may be employed when at least some of the IP addresses that are represented by the nodes of a graph have already been identified as suspicious. Similar to the unsupervised embodiments, the graph builder 314 may construct a bipartite graph that includes a subset of nodes with a first subset of nodes representing DNS IP addresses and a second subset of nodes representing target IP addresses. The supervised embodiments may be referred to as semi-supervised embodiments because a portion of the nodes are known to represent suspicious IP addresses, while another portion of the nodes may represent suspicious IP addresses that are not yet known to be suspicious and still another portion of the nodes represent (known or unknown) trustworthy IP addresses.

As noted above, the bipartite structure of the graphs naturally subdivides the nodes of the set of nodes into two disjoint (and complementary) subsets based on the two portions: a first subset of nodes representing the DNS IP addresses and a second subset of nodes representing the target IP addresses. Because at least some of the nodes represent IP addresses known to be suspicious, the nodes may be alternatively subdivided into a two other disjoint and complementary subsets of nodes. The set of nodes may be subdivided into a third subset of nodes representing the known suspicious IP addresses and a fourth subset of nodes that represent the IP addresses that are not known to be suspicious IP addresses. As noted above, the nodes in the first subset of nodes may be referred to as DNS nodes, while the nodes in the second subset of nodes may be referred to as target nodes. The nodes in the third subset of nodes may be referred to as labeled suspicious nodes and the fourth subset of nodes may be referred to as unclassified nodes. A subset of the unclassified nodes may represent as of yet unknown suspicious nodes and another subset of the unclassified nodes (which is complementary to the subset of unknown suspicious nodes) may represent as of yet unknown trustworthy nodes. The set (or subset) of labeled suspicious nodes may be referenced as: $\mathcal{T} = \{IP_1^{sus}, IP_2^{sus}, IP_3^{sus}, \ldots IP_K^{sus}\}$, where K is a positive integer and the superscript sus indicates that the node (or IP address) is known to be suspicious. The set (or subset) of as of yet unclassified nodes may be referenced as: $S=\{IP_1^{uncl}, IP_2^{uncl}, IP_3^{uncl}, IP_L^{uncl}\}$, where L is a positive integer and the superscript unci indicates that the node (or IP address) is not yet classified. The supervised classifier 320 may be enabled to classify each of the unclassified nodes in S as either suspicious or non-suspicious (e.g., trustworthy).

Similar to the unsupervised embodiments, the supervised embodiments may be performed at the domain name level, such that the analysis for each domain name may be parallelized. The supervised embodiments may fall into one of two types of supervised embodiments: vector embedding embodiments and belief propagation embodiments. For the vector embedding embodiments, each node of the bipartite graph (G) may be embedded in a vector representation. That is, the graph may be provided to a vector embedding algorithm, such as but not limited to a node2vec (or node2vect-like) algorithm. Such vector embedding algorithms may be deeply trained to embed the nodes of a vector in a multi-dimensional vector space, where the vector embeddings encode deeply learned (latent or hidden) features of the graph. That is, a vector embedding algorithm (e.g., $\mathcal{A}$) may receive the G as an input, and map each node to a vector representation as such: $\mathcal{A}: IP \to \mathbb{R}^d$, where d is a positive integer that indicates the dimensionality of the vector space. In some embodiments, the vector embeddings of the nodes may be relatively low-dimensional. That is, the vector embedding algorithm employed may be trained to learn relatively low-dimensional representations of the features of the graph. These vector embedding embodiments employ the intuition that nodes with similar positions in the vector space share similar features. Thus, unclassified nodes that are somewhat near the known suspicious nodes (via their vector embeddings) are more likely to be suspicious than unclassified nodes positioned further away from the known suspicious nodes.

Similar to the unsupervised embodiments, for the supervised vector embedding embodiments, a risk score may be calculated for each as yet unclassified nodes as follows:

$$R_{IP}(IP_j^{uncl}) = \frac{1}{K} \sum_i^K Sim(\mathcal{A}(IP_j^{uncl}), \mathcal{A}(IP_i^{sus})),$$

where Sim represents any similarity or distance function between the vector embeddings and the summation is performed over the set of labeled suspicious nodes. The similarity or distance function employed may be any distance metric, such as but not limited to a cosine distance (or similarity), a hamming distance, a Euclidean distance, a Manhattan distance, a Minkowski distance, or the like. Similar to the unsupervised embodiments, in the vector embedding embodiments, the nodes in S may be ranked, via their risk scores, and classified as either suspicious or trustworthy, based on the rankings.

A similar approach may be employed for the supervised and/or semi-supervised belief propagation embodiments. Rather than employing a vector embedding algorithm, the graph may be provided as input to a belief propagation algorithm. Briefly, a belief propagation algorithm receives a graphical model (e.g., a tree or a graph), where some of the nodes in the graphical model are observed (e.g., nodes labeled as suspicious) and other nodes are unobserved (e.g., as of yet unclassified nodes) and determines a marginal distribution for the unobserved nodes that is conditioned on the observed nodes. The marginal distribution for the unclassified nodes may be employed to determine the risk score for the unclassified nodes. Various belief propagation algorithms may be employed, such as but not limited to a SybilScar algorithm. The belief propagation algorithm may be referenced as $\mathcal{B}$. In the belief propagation embodiments, the risk score for the as yet unclassified nodes may be calculated as follows:

$$R_{IP}(IP_j^{uncl}) = \mathcal{B}(G, \mathcal{T}, IP_j^{unci})$$

Similar to the unsupervised embodiments, in the belief propagation embodiments, the nodes in S may be ranked, via their risk scores, and classified as either suspicious or trustworthy, based on the rankings.

Example Methods for Monitoring the Security of a Domain Name System

With reference to FIGS. 4-7, flow diagrams are provided illustrating methods for monitoring the security of an internet-based domain name system (DNS). The methods may be performed using any of the embodiments of a DNS security monitor described herein. In embodiments, one or more computer storage media having computer-executable instructions embodied thereon that, when executed, by one or more processors can cause the one or more processors to perform the methods in the storage system.

Figure 4:
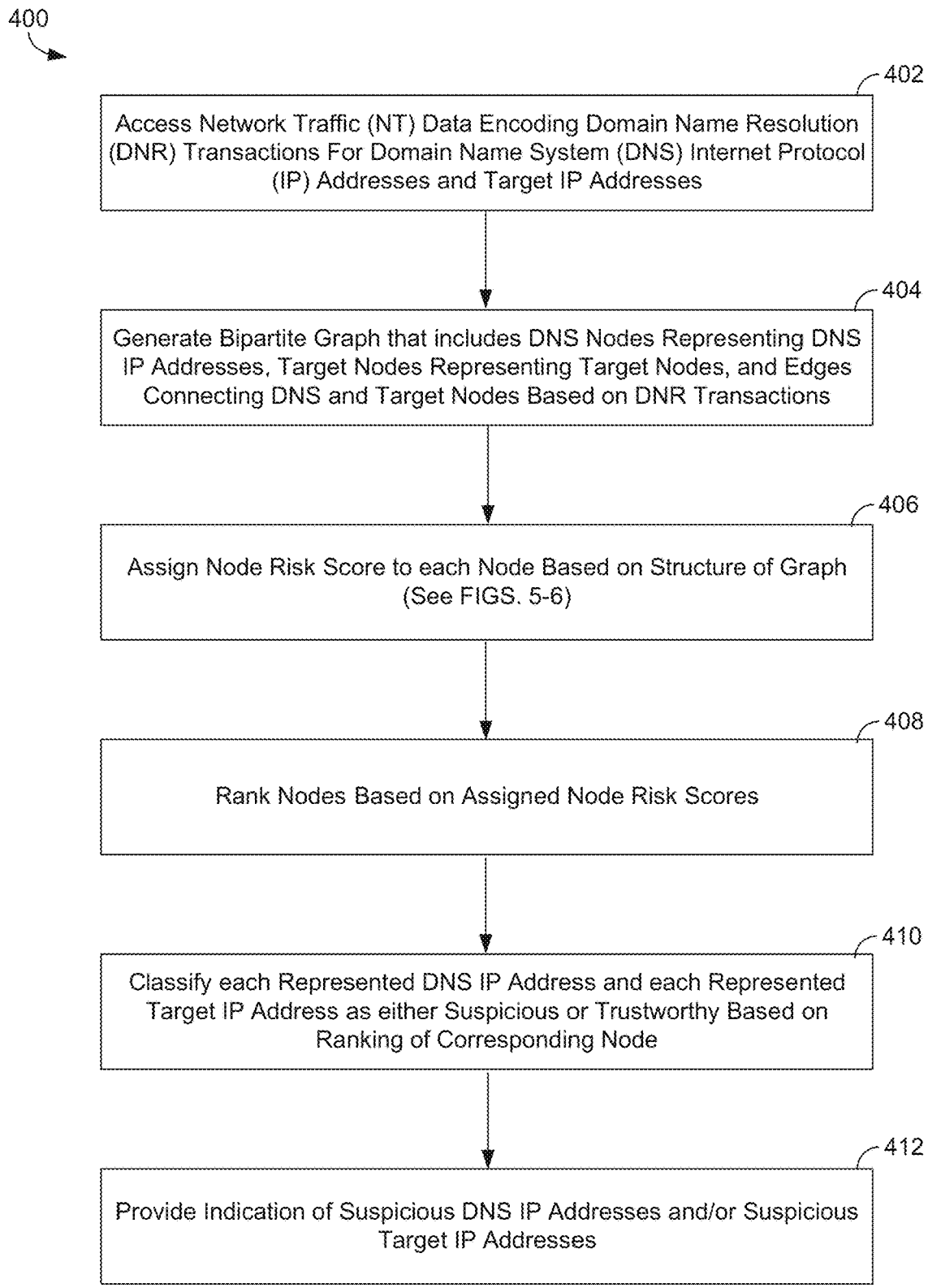
FIG. 4 provides a flow diagram that illustrates a method for detecting suspicious IP addresses associated with domain name resolution transactions of a DNS system.

Turning to FIG. 4, a flow diagram is provided that illustrates a method 400 for detecting suspicious internet protocol (IP) addresses associated with domain name resolution (DNR) transactions of a DNS system. Generally, the flow diagram of FIG. 4 can be implemented using the architecture described above at least in conjunction with FIGS. 1-3. For example, any suitable combination of portions of method 400 may be implemented by DNS security monitor 220 of FIG. 2 and/or DNS security monitor 300 of FIG. 3.

Initially, method 400 begins at block 402, where network traffic (NT) data is accessed. The NT data encodes a set of DNR transactions associated with a set of DNS addresses and a set of target addresses. The set of DNR transactions may be a plurality of DNR transactions. At block 404, the NT data is employed to generate a graph data structure. The graph data structure (or graph) includes a set of nodes and a set of edges. The set of nodes may be a plurality of nodes and the set of edges may be a plurality of edges. The graph may be a bipartite graph. A first part of the bipartite graph includes a first subset of the set of nodes. A second part of the bipartite graph includes a second subset of the set of nodes. Each node in the first subset of the set of nodes represents a DNS address of the set of DNS addresses. Thus, the first subset of nodes may be a plurality of DNS nodes. Each node in the second subset of the set of nodes represents a target address of the set of target addresses. Thus, the second subset of nodes may be a plurality of target nodes. Each edge of the set of edges is based on the set of DNR transactions and connects a node of the first subset of nodes to a node of the second subset of nodes. Thus, the plurality of nodes may connect each DNS node of the plurality of DNS nodes to one or more target nodes of the plurality of target nodes.

At block 406, a node risk score is assigned to each node of the set of nodes. A particular node risk score assigned to a particular node of the set of nodes is based on a subset of the set of edges and third subset of the set of nodes. Each edge in the subset of edges connects the particular node to a node of the third subset of nodes. Accordingly, the node risk score may be based on a structure of the graph structure. At block 408, the set of nodes is ranked based on the node risk score assigned to each of the nodes of the set of nodes. At block 410, each of the represented DNS IP addresses and each of the represented target IP addresses are classified as either suspicious or trustworthy (e.g., non-suspicious) based on the rankings of the corresponding nodes. More specifically, a fourth subset of the set of nodes is identified based on the ranked set of nodes. Each DNS address of the set of DNS addresses that is represented by a node in the fourth subset of nodes is classified as a suspicious DNS address. Each target address of the set of target addresses that is represented by a node in the fourth subset of nodes is classified as a suspicious target address. Each DNS IP address and each target IP address that is not represented by a node of the set of nodes that is included in the fourth subset of nodes is classified as a non-suspicious DNS or target IP address. At block 412, an indication of at least one of a suspicious DNS address or a suspicious target address represented by the fourth subset of nodes is provided.

Figure 5:
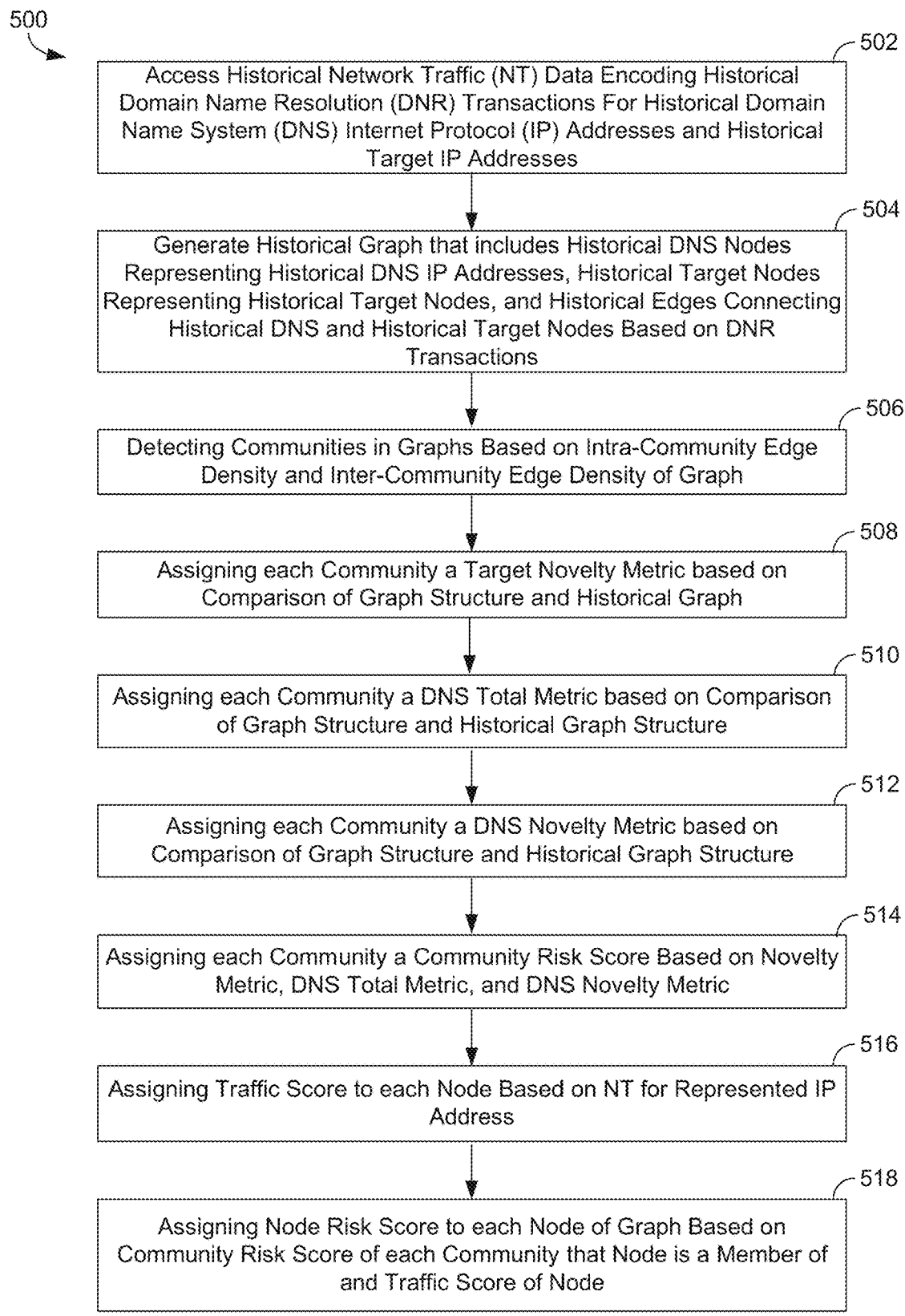
FIG. 5 provides a flow diagram that illustrates an unsupervised method for classifying IP addresses as suspicious or trustworthy that is consistent with the various embodiments.

Turning to FIG. 5, a flow diagram is provided that illustrates an unsupervised method 500 for classifying internet protocol (IP) addresses as suspicious or trustworthy that is consistent with the various embodiments. Method 500 begins at block 502, where historical NT data is accessed. The historical NT data encodes a set of historical DNR transactions associated with a set of historical DNS addresses and a set of historical target addresses. The set of historical DNR transactions may be a plurality of historical DNR transactions. The set of historical DNS addresses may be a plurality of historical DNS addresses. The set of historical target addresses may be a plurality of historical target addresses. Thus, the historical DNR transactions may be associated with a plurality of historical addresses. The plurality of historical addresses may include a plurality of historical DNS addresses and a plurality of historical target addresses. Each historical DNR transaction of the set of historical DNR transactions may have occurred prior to each of the DNR transactions of the set of DNR transactions encoded in the NT data accessed at block 402 of method 400. The NT data and the encoded DNR transactions may be referred to as current NT data and current DNR transactions. Likewise, the set of DNS IP addresses and the set of target IP addresses of method 400 may be referred to as current DNS IP addresses and current target IP addresses.

At block 504, the historical NT data is employed to generate a historical graph data structure that includes a set of historical nodes and a set of historical edges. The set of historical nodes may be a plurality of historical nodes. The set of historical edges may be a plurality of historical edges. Like the graph generated at block 404 of method 400, the historical graph may be a bipartite graph. The graph of method 400 may be referred to as a current graph. Each historical node in a first subset of the set of historical nodes represents a historical DNS address of the set of historical DNS addresses. The first subset of historical nodes may be a plurality of historical DNS nodes. Each node in a second subset of the set of historical nodes represents a historical target address of the set of historical target addresses. The second subset of historical nodes may be a plurality of historical target nodes. Each historical edge of the set of historical edges is based on the set of historical DNR transactions and connects a historical DNS node of the first subset of historical nodes to a historical target node of the second subset of historical nodes.

At block 506, a community detection algorithm is employed to detect, identify, or generate a set of communities for the graph data structure (i.e., the current graph). The set of communities may be a plurality of communities. Each community of the set of communities includes a unique subset of the set of nodes. A subset of nodes may be a portion of the plurality of nodes. An intra-community edge density for a particular community of the set of communities is greater than an inter-community edge density between the particular community and any other community of the set of communities. At block 508, a target novelty metric (e.g., $w_i$) is assigned to each community based on the comparison between the (current) graph and the historical graph. The target novelty score for each community may be based on a fraction of nodes included in the community that represent target IP addresses that are excluded from the set of historical target addresses. At block 510, a DNS total metric (e.g., Dr) is assigned to each community based on the comparison between the (current) graph and the historical graph. At block 512, a DNS novelty metric (e.g., Dr) is assigned to each community based on the comparison between the (current) graph and the historical graph. The DNS novelty metric assigned to each community may be based on a fraction of nodes included in the community that represent DNS addresses that are excluded from the set of historical DNS addresses. The DNS novelty metric may be based on a fraction of nodes included in the first subset of nodes that are connected to a node included in the community that represent DNS addresses that are excluded from the set of historical DNS addresses. At block 514, a community risk score (e.g., $R_C(C_i)$) is assigned to each community of the set of communities based on the comparison between the (current) graph and the historical graph. In some embodiments, the community risk score for each community may be based on the target novelty metric, the DNS total metric, and the DNS novelty metric for the community.

At block 516, a traffic score (e.g., $T_{IP}$) is assigned to (or determined for) each node of the set of nodes. The traffic risk score may be based on a fraction of network traffic associated with a target address or DNS address that is represented by the node compared to a total network traffic associated with the network traffic data. At block 518, a node risk score may be assigned to each node of the set of nodes based on the comparison between the graph data structure and the historical graph data structure. More particularly, the node risk score assigned to a node may be based on the community risk score of each community that the node is included in. The node risk score may be further based on the traffic score determined and/or assigned to the community.

Figure 6:
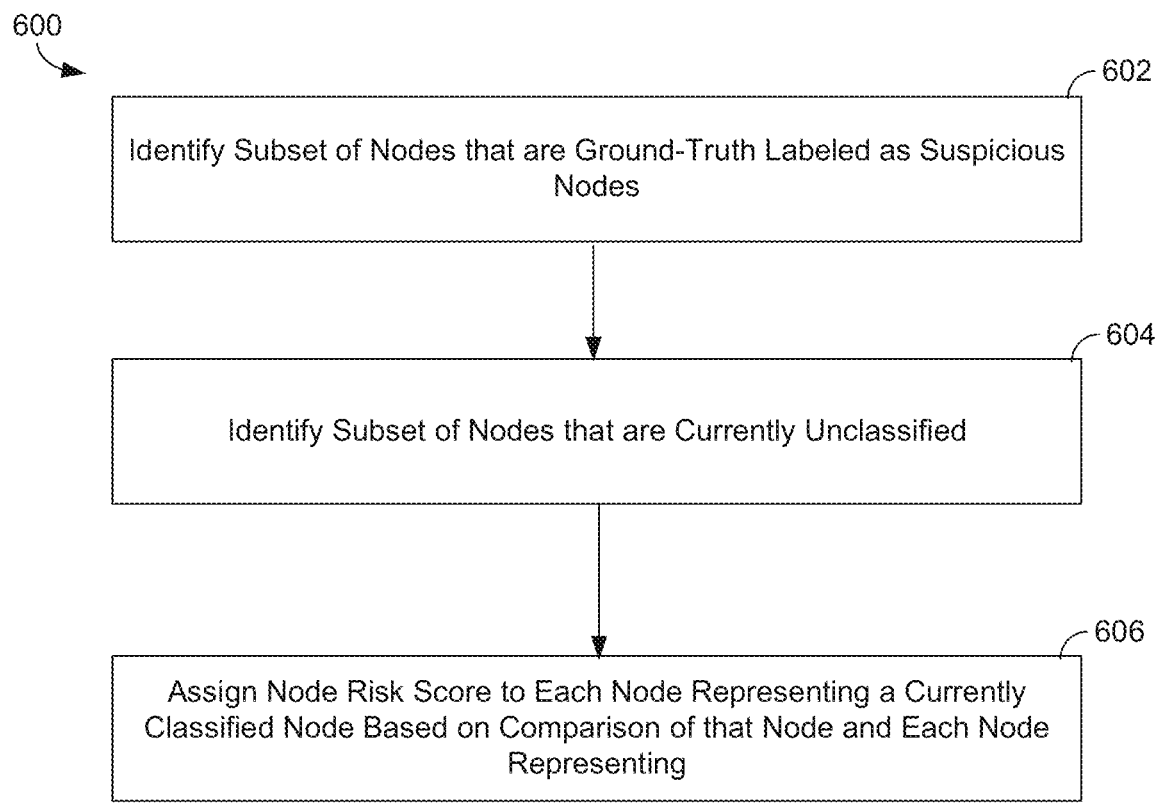
FIG. 6 provides a flow diagram that illustrates a supervised method for classifying IP addresses as suspicious or trustworthy that is consistent with the various embodiments.

Turning to FIG. 6, a flow diagram is provided that illustrates a supervised method 600 for classifying internet protocol (IP) addresses as suspicious or trustworthy that is consistent with the various embodiments. Method 600 begins at block 602, where a fifth subset of nodes of the graph is identified. Each node included in the fifth subset of nodes is ground-truth labeled as a suspicious node. At block 604, a sixth subset of nodes of the graph is identified. Each node included in the sixth subset of nodes is currently not predicted to be either suspicious or non-suspicious. At block

606, a node risk score is assigned to each node included in the sixth subset of nodes. A determination of the node risk score may be based on a comparison of the node included in the sixth subset of nodes and each node included in the fifth subset of nodes.

To determine the node risk score in vector embedding embodiments, a vector representation may be generated for each node included in the fifth subset of nodes. A vector representation may be generated for each node included in the sixth subset of nodes. The node risk score assigned to each node included in the sixth subset of nodes may be determined based on a comparison of the vector representation of the node included in the sixth subset of nodes and the vector representation of each node included in the fifth subset of nodes. In belief propagation embodiments, the comparison of the node included in the sixth subset of nodes and each node included in the fifth subset of nodes is based on a belief propagation algorithm.

Figure 7:
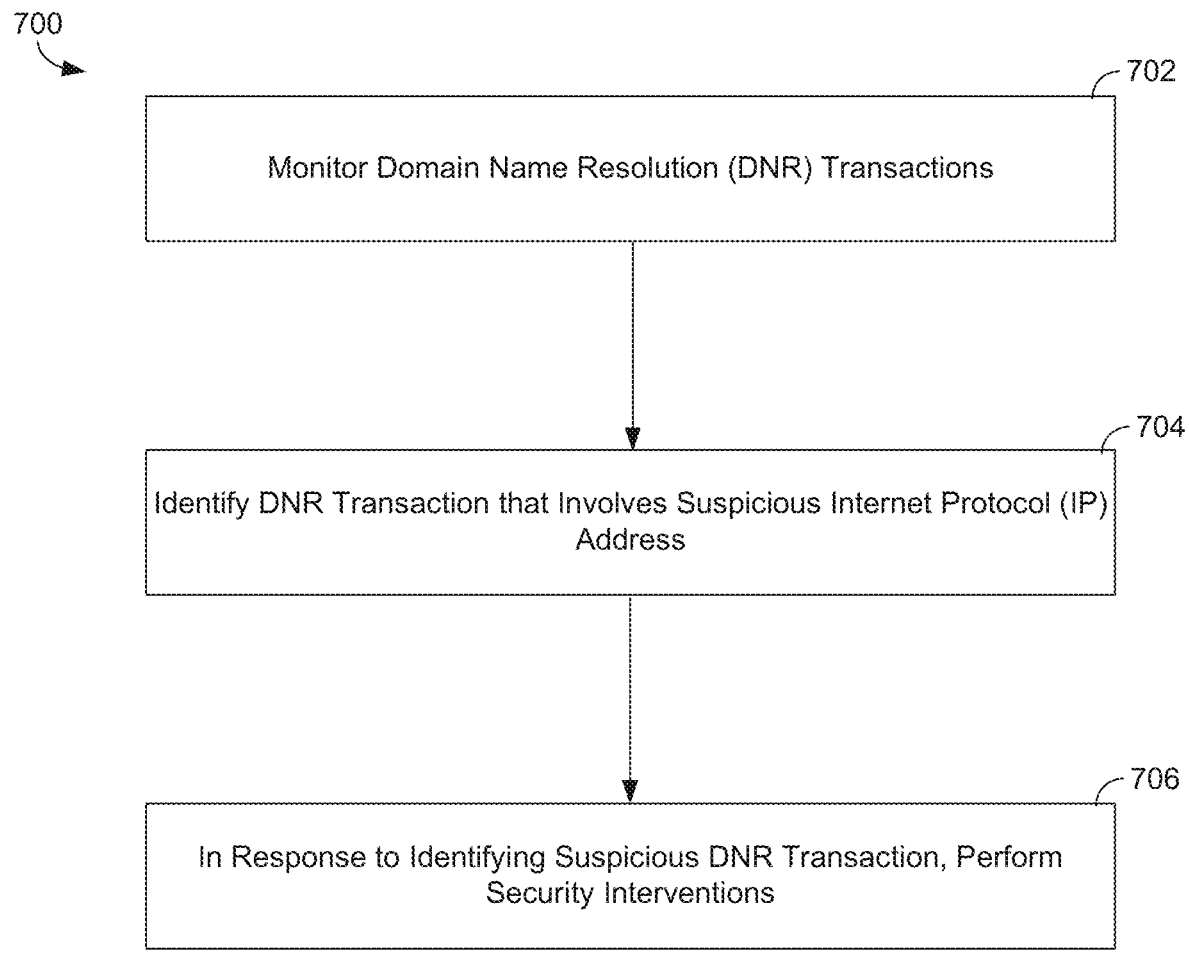
FIG. 7 provides a flow diagram that illustrates a real-time method for mitigating security threats for a DNS system that is consistent with the various embodiments.

Turning to FIG. 7, a flow diagram is provided that illustrates a real-time method 700 for mitigating security threats for a DNS system that is consistent with the various embodiments. Method 700 begins at block 702, where DNR transactions are monitored in real-time. At block 704, DNR transactions that involve suspicious IP addresses are identified in real-time. At block 706, and in response to identifying a suspicious DNR transaction, one or more security interventions are performed and/or invoked.

Other Embodiments

The embodiments may be directed towards one or more of methods, system, and/or non-transitory computer readable storage media, and provide increased security and integrity of communication networks by detecting and mitigating security threats to a Domain Name System (DNS). One exemplary, but non-limiting method embodiment, a method may include accessing network traffic (NT) data. The NT data may encode a set of domain name resolution (DNR) transactions associated with a set of DNS addresses (e.g., each DNS address of the set of DNS addresses may correspond to a DNS server) and a set of target addresses (e.g., each target address of the set of target addresses may correspond to a web server. The NT data may be employed to generate a graph data structure. The graph data structure (or simply the graph) may include a set of nodes and a set of edges. Each node in a first subset of the set of nodes represents a DNS address of the set of DNS addresses. Each node in a second subset of the set of nodes represents a target address of the set of target addresses. Each edge of the set of edges is based on the set of DNR transactions and connects a node of the first subset of nodes to a node of the second subset of nodes. A node risk score is assigned to each node of the set of nodes. A particular node risk score assigned to a particular node of the set of nodes is based on a subset of the set of edges and third subset of the set of nodes. Each edge in the subset of edges connects the particular node to a node of the third subset of nodes. The set of nodes is ranked based on the node risk score assigned to each of the nodes of the set of nodes. A fourth subset of the set of nodes is identified based on the ranked set of nodes. Each DNS address of the set of DNS addresses that is represented by a node in the fourth subset of nodes is classified as a suspicious DNS address. Each target address of the set of target addresses that is represented by a node in the fourth subset of nodes is classified as a suspicious target address. An indication of at least one of a suspicious DNS address or a suspicious target address represented by the fourth subset of nodes is provided. In this way, communication with suspicious address can be avoided (e.g., blocked), or more closely monitored or analyzed, thereby increasing security and integrity of communication networks.

In some method embodiments, the method may further include accessing historical NT data. The historical data encodes a set of historical DNR transactions associated with a set of historical DNS addresses and a set of historical target addresses. Each historical DNR transaction of the set of historical DNR transactions occurred prior to each of the DNR transactions of the set of DNR transactions. The historical NT data may be employed to generate a historical graph data structure. The historical graph data structure may include a set of historical nodes and a set of historical edges. Each historical node in a first subset of the set of historical nodes may represent a historical DNS address of the set of historical DNS addresses. Each node in a second subset of the set of historical nodes may represent a historical target address of the set of historical target addresses. Each historical edge of the set of historical edges may be based on the set of historical DNR transactions. Each historical edge of the set of historical edges may connect a historical DNS node of the first subset of historical nodes to a historical target node of the second subset of historical nodes. A node risk score may be assigned to each node of the set of nodes based on a comparison between the graph data structure and the historical graph data structure.

In some method embodiments, the method may further include employing a community detection algorithm to detect a set of communities for the graph data structure. Each community of the set of communities includes a unique subset of the set of nodes. An intra-community edge density for a particular community of the set of communities may be greater than an inter-community edge density between the particular community and any other community of the set of communities. A community risk score may be assigned to each community of the set of communities based on the comparison between the graph data structure and the historical graph data structure. A node risk score may be assigned to each node of the set of nodes based the community risk score of each community that the node is included in. In various method embodiments, the community risk score that is assigned to each community of the set of communities may be determined further based on a fraction of nodes included in the community that represent target addresses that are excluded from the set of historical target addresses. The community reputation score that is assigned to each community of the set of communities may be determined additionally based on a fraction of nodes included in the community that represent DNS addresses that are excluded from the set of historical DNS addresses. In still additional method embodiments, the community risk score that is assigned to each community of the set of communities may be determined further based on a fraction of nodes included in the first subset of nodes that are connected to a node included in the community that represents DNS addresses that are excluded from the set of historical DNS addresses.

In at least one method embodiment, the method may further include assigning a traffic score is to each node of the set of nodes. The traffic score assigned to a node may be based on a fraction of network traffic associated with a target address or a DNS address that is represented by the node compared to a total network traffic associated with the network traffic data.

In still other method embodiments, the method may additionally may include identifying a fifth subset of nodes of the graph. Each node included in the fifth subset of node may be ground-truth labeled as a suspicious node. A sixth subset of nodes of the set of nodes may be identified. Each node included in the sixth subset of nodes may be currently unclassified. The node risk score that is assigned to each node included in the sixth subset of nodes may be based on a comparison of the nodes included in the sixth subset of nodes and each node included in the fifth subset of nodes. In some method embodiments, a vector representation for each node included in the fifth subset of nodes is generated. A vector representation for each node included in the sixth subset of nodes may also be generated. The node risk score that is assigned to each node included in the sixth subset of nodes may be based on a comparison of the vector representation of the node included in the sixth subset of nodes and the vector representation of each node included in the fifth subset of nodes. In some method embodiments, the comparison of the node included in the sixth subset of nodes and each node included in the fifth subset of nodes may be based on a belief propagation algorithm (e.g., an algorithm implement by a Bayesian network).

Other embodiments are directed to a system, that may be operated to provide increased security and integrity of communication networks such as by detecting and mitigating security threats to a Domain Name System (DNS). The system may comprise one or more hardware processors and one or more computer-readable media having executable instructions embodied thereon. When the executable instructions are executed by the one or more processors, the one or more hardware processors may execute actions, operations, or steps may include or comprise accessing network traffic (NT) data. The NT data may encode a set of domain name resolution (DNR) transactions associated with a set of DNS addresses (e.g., each DNS address of the set of DNS addresses may correspond to a DNS server) and a set of target addresses (e.g., each target address of the set of target addresses may correspond to a web server. The NT data may be employed to generate a graph data structure. The graph data structure (or simply the graph) may include a set of nodes and a set of edges. Each node in a first subset of the set of nodes represents a DNS address of the set of DNS addresses. Each node in a second subset of the set of nodes represents a target address of the set of target addresses. Each edge of the set of edges is based on the set of DNR transactions and connects a node of the first subset of nodes to a node of the second subset of nodes. A node risk score is assigned to each node of the set of nodes. A particular node risk score assigned to a particular node of the set of nodes is based on a subset of the set of edges and third subset of the set of nodes. Each edge in the subset of edges connects the particular node to a node of the third subset of nodes. The set of nodes is ranked based on the node risk score assigned to each of the nodes of the set of nodes. A fourth subset of the set of nodes is identified based on the ranked set of nodes. Each DNS address of the set of DNS addresses that is represented by a node in the fourth subset of nodes is classified as a suspicious DNS address. Each target address of the set of target addresses that is represented by a node in the fourth subset of nodes is classified as a suspicious target address. An indication of at least one of a suspicious DNS address or a suspicious target address represented by the fourth subset of nodes is provided. In this way, communication with suspicious DNS address can be avoided (e.g., blocked), or more closely monitored or associated network traffic or activity analyzed, thereby increasing security and integrity of communication networks.

In some system embodiments, the actions may further include accessing historical NT data. The historical data encodes a set of historical DNR transactions associated with a set of historical DNS addresses and a set of historical target addresses. Each historical DNR transaction of the set of historical DNR transactions occurred prior to each of the DNR transactions of the set of DNR transactions. The historical NT data may be employed to generate a historical graph data structure. The historical graph data structure may include a set of historical nodes and a set of historical edges. Each historical node in a first subset of the set of historical nodes may represent a historical DNS address of the set of historical DNS addresses. Each node in a second subset of the set of historical nodes may represent a historical target address of the set of historical target addresses. Each historical edge of the set of historical edges may be based on the set of historical DNR transactions. Each historical edge of the set of historical edges may connect a historical DNS node of the first subset of historical nodes to a historical target node of the second subset of historical nodes. A node risk score may be assigned to each node of the set of nodes based on a comparison between the graph data structure and the historical graph data structure.

In some system embodiments, the actions may further include employing a community detection algorithm to detect a set of communities for the graph data structure. Each community of the set of communities includes a unique subset of the set of nodes. An intra-community edge density for a particular community of the set of communities may be greater than an inter-community edge density between the particular community and any other community of the set of communities. A community risk score may be assigned to each community of the set of communities based on the comparison between the graph data structure and the historical graph data structure. A node risk score may be assigned to each node of the set of nodes based the community risk score of each community that the node is included in. In various system embodiments, the community risk score that is assigned to each community of the set of communities may be determined further based on a fraction of nodes included in the community that represent target addresses that are excluded from the set of historical target addresses. The community reputation score that is assigned to each community of the set of communities may be determined additionally based on a fraction of nodes included in the community that represent DNS addresses that are excluded from the set of historical DNS addresses. In still additional system embodiments, the community risk score that is assigned to each community of the set of communities may be determined further based on a fraction of nodes included in the first subset of nodes that are connected to a node included in the community that represents DNS addresses that are excluded from the set of historical DNS addresses.

In at least one system embodiment, the actions may further includes assigning a traffic score is to each node of the set of nodes. The traffic score assigned to a node may be based on a fraction of network traffic associated with a target address or a DNS address that is represented by the node compared to a total network traffic associated with the network traffic data.

In still other system embodiments, the actions may additionally include identifying a fifth subset of nodes of the graph. Each node included in the fifth subset of node may be ground-truth labeled as a suspicious node. A sixth subset of nodes of the set of nodes may be identified. Each node included in the sixth subset of nodes may be currently unclassified. The node risk score that is assigned to each node included in the sixth subset of nodes may be based on a comparison of the nodes included in the sixth subset of nodes and each node included in the fifth subset of nodes. In some system embodiments, a vector representation for each node included in the fifth subset of nodes is generated. A vector representation for each node included in the sixth subset of nodes may also be generated. The node risk score that is assigned to each node included in the sixth subset of nodes may be based on a comparison of the vector representation of the node included in the sixth subset of nodes and the vector representation of each node included in the fifth subset of nodes. In some system embodiments, the comparison of the node included in the sixth subset of nodes and each node included in the fifth subset of nodes may be based on a belief propagation algorithm (e.g., an algorithm implement by a Bayesian network).

Still other embodiments are directed to a non-transitory computer-readable storage media. The media may store computer-useable instructions that, when used by one or more computing devices, cause the one or more computing devices to perform actions, operations, and/or steps. The actions may comprise accessing network traffic (NT) data. The NT data may encode a set of domain name resolution (DNR) transactions associated with a set of DNS addresses (e.g., each DNS address of the set of DNS addresses may correspond to a DNS server) and a set of target addresses (e.g., each target address of the set of target addresses may correspond to a web server. The NT data may be employed to generate a graph data structure. The graph data structure (or simply the graph) may include a set of nodes and a set of edges. Each node in a first subset of the set of nodes represents a DNS address of the set of DNS addresses. Each node in a second subset of the set of nodes represents a target address of the set of target addresses. Each edge of the set of edges is based on the set of DNR transactions and connects a node of the first subset of nodes to a node of the second subset of nodes. A node risk score is assigned to each node of the set of nodes. A particular node risk score assigned to a particular node of the set of nodes is based on a subset of the set of edges and third subset of the set of nodes. Each edge in the subset of edges connects the particular node to a node of the third subset of nodes. The set of nodes is ranked based on the node risk score assigned to each of the nodes of the set of nodes. A fourth subset of the set of nodes is identified based on the ranked set of nodes. Each DNS address of the set of DNS addresses that is represented by a node in the fourth subset of nodes is classified as a suspicious DNS address. Each target address of the set of target addresses that is represented by a node in the fourth subset of nodes is classified as a suspicious target address. An indication of at least one of a suspicious DNS address or a suspicious target address represented by the fourth subset of nodes is provided.

In some media embodiments, the actions may further include accessing historical NT data. The historical data encodes a set of historical DNR transactions associated with a set of historical DNS addresses and a set of historical target addresses. Each historical DNR transaction of the set of historical DNR transactions occurred prior to each of the DNR transactions of the set of DNR transactions. The historical NT data may be employed to generate a historical graph data structure. The historical graph data structure may include a set of historical nodes and a set of historical edges. Each historical node in a first subset of the set of historical nodes may represent a historical DNS address of the set of historical DNS addresses. Each node in a second subset of the set of historical nodes may represent a historical target address of the set of historical target addresses. Each historical edge of the set of historical edges may be based on the set of historical DNR transactions. Each historical edge of the set of historical edges may connect a historical DNS node of the first subset of historical nodes to a historical target node of the second subset of historical nodes. A node risk score may be assigned to each node of the set of nodes based on a comparison between the graph data structure and the historical graph data structure.

In some media embodiments, the actions may further include employing a community detection algorithm to detect a set of communities for the graph data structure. Each community of the set of communities includes a unique subset of the set of nodes. An intra-community edge density for a particular community of the set of communities may be greater than an inter-community edge density between the particular community and any other community of the set of communities. A community risk score may be assigned to each community of the set of communities based on the comparison between the graph data structure and the historical graph data structure. A node risk score may be assigned to each node of the set of nodes based the community risk score of each community that the node is included in. In various media embodiments, the community risk score that is assigned to each community of the set of communities may be determined further based on a fraction of nodes included in the community that represent target addresses that are excluded from the set of historical target addresses. The community reputation score that is assigned to each community of the set of communities may be determined additionally based on a fraction of nodes included in the community that represent DNS addresses that are excluded from the set of historical DNS addresses. In still additional media embodiments, the community risk score that is assigned to each community of the set of communities may be determined further based on a fraction of nodes included in the first subset of nodes that are connected to a node included in the community that represents DNS addresses that are excluded from the set of historical DNS addresses.

In at least one media embodiment, the actions may further include assigning a traffic score is to each node of the set of nodes. The traffic score assigned to a node may be based on a fraction of network traffic associated with a target address or a DNS address that is represented by the node compared to a total network traffic associated with the network traffic data.

In still other media embodiments, the actions may additionally may include identifying a fifth subset of nodes of the graph. Each node included in the fifth subset of node may be ground-truth labeled as a suspicious node. A sixth subset of nodes of the set of nodes may be identified. Each node included in the sixth subset of nodes may be currently unclassified. The node risk score that is assigned to each node included in the sixth subset of nodes may be based on a comparison of the nodes included in the sixth subset of nodes and each node included in the fifth subset of nodes. In some media embodiments, a vector representation for each node included in the fifth subset of nodes is generated. A vector representation for each node included in the sixth subset of nodes may also be generated. The node risk score that is assigned to each node included in the sixth subset of nodes may be based on a comparison of the vector representation of the node included in the sixth subset of nodes and the vector representation of each node included in the fifth subset of nodes. In some media embodiments, the comparison of the node included in the sixth subset of nodes and each node included in the fifth subset of nodes may be based on a belief propagation algorithm.

In another exemplary, but non-limiting, method embodiment comprises and/or includes accessing network traffic (NT) data. The NT data may encode at least one domain name resolution (DNR) transaction. The at least one DNR transaction may be associated with a plurality of addresses. The plurality of addresses may include a plurality of domain name system (DNS) addresses and a plurality of target addresses. The plurality of DNS addresses may be at least one DNS address and/or one or more DNS addresses. The plurality of target addresses may be at least one target address and/or one or more target addresses. The method may employ the NT data to generate a graph data structure (or simply a data structure). The graph data structure may include a plurality of nodes representing the plurality of addresses and a plurality of edges. The plurality of nodes may include a plurality of DNS nodes that represents the plurality of DNS addresses. The plurality of DNS nodes may be at least one DNS node and/or one or more DNS addresses. Thus, the at least one DNS node may represent the at least one DNS addresses. The plurality of nodes may additionally include a plurality of target nodes that represent the plurality of target addresses. In some embodiments, the plurality of target nodes may comprise at least one target node and/or one or more target addresses. Accordingly, the at least one target node may represent the at least one target address. The plurality of edges may connect each of the plurality of DNS nodes to one or more of the plurality of target nodes based on the at least one DNR transaction. The method may further assign a node risk score to each of the plurality of nodes based on a structure of the graph data structure. A first portion of the plurality of nodes may be identified based on the node risk score assigned to each of the plurality of nodes. Each address of the plurality of addresses that is represented by a node that is included in the identified first portion of the plurality of nodes may be classified as a suspicious address. The method may further provide an indication of at least one address of the plurality of addresses that has been classified as a suspicious address.

In some method embodiments, the method may further include accessing historical NT data. The historical NT data may encode a at least one historical DNR transaction. The at least one historical DNR transaction may be associated with a plurality of historical addresses. The plurality of historical addresses that may include a plurality of historical DNS addresses and a plurality of historical target addresses. Each historical DNR transaction of the at least one historical DNR transaction may have occurred prior to each DNR transaction of the at least one DNR transaction. The historical NT data may be employed to generate a historical graph data structure. The historical graph data structure may including a plurality of historical nodes and a plurality of historical edges. The plurality of historical nodes may represent the plurality of historical addresses. The plurality of historical nodes may include a plurality of historical DNS nodes that represent the plurality of historical DNS addresses. The plurality of historical nodes may additional include a plurality of historical target nodes that represent the plurality of historical target addresses. The plurality of historical edges may connect each of the plurality of historical DNS nodes to one or more of the plurality of historical target nodes based on the at least one historical DNR transaction. The method may further include assigning the node risk score to each node of the plurality of nodes based on a comparison between the graph data structure and the historical graph data structure.

In some method embodiments, the method may further include employing a community detection algorithm to detect a plurality of communities for the graph data structure. Each community of the plurality of communities may include a unique portion of the plurality of nodes. An intra-community edge density for a particular community of the plurality of communities may be greater than an inter-community edge density between the particular community and any other community of the plurality of communities. A community risk score may be assigned to each community of the plurality of communities. The community risk score may be based on the comparison between the graph data structure and the historical graph data structure. The method may further include assigning the node risk score to each of the plurality of nodes based on the community risk score of each community that the node is included in.

In some method embodiments, the community risk score assigned to each community of the plurality of communities may be determined further based on a fraction of target nodes of the plurality of target nodes that are included in the community and are excluded from the plurality of historical target addresses. The community risk score assigned to each community of the plurality of communities may be determined further based on a fraction of DNS nodes of the plurality of DNS nodes that are included in the community and are excluded from the plurality of historical DNS addresses. In some method embodiments, the community risk score assigned to each community of the plurality of communities may be determined further based on a fraction of DNS nodes of the plurality of DNS nodes that are connected to a target node of the plurality of target nodes that is included in the community and is excluded from the plurality of historical DNS addresses. In still other methods embodiments, the method may further include assigning a traffic score to each node of the plurality of nodes. The traffic score may be based on a fraction of network traffic associated with an address of the plurality of address that is represented by the node compared to a total network traffic associated with the network traffic data. The node risk score for each node of the plurality of nodes may determined be based on the traffic score assigned to the node.

In still other method embodiments, the method may further include identifying a second portion of the plurality of nodes. Each node included in the second portion of the plurality of nodes may be ground-truth labeled as a suspicious node. A third portion of the plurality of nodes may be identified. Each node included in the third portion of the plurality of nodes may be unclassified. The method may further include assigning the node risk score to each node included in the third portion of the plurality of nodes. The assigned node risk score may be based on a comparison of the nodes included in the third portion of the plurality of nodes and each node included in the second portion of the plurality of nodes. Such method embodiments may further include generating a vector representation for each node included in the second portion of the plurality of nodes. A vector representation may be generated for each node included in the third portion of the plurality of nodes. The method may further include assigning the node risk score to each node included in the second portion of the plurality of nodes based on a comparison of the vector representation of the nodes included in the second portion of the plurality of nodes and the vector representation of each node included in the third portion of the plurality of nodes. In some method embodiments, the comparison of the node included in the third portion of the plurality of nodes and each node included in the second portion of the plurality of nodes is based on a belief propagation algorithm.

In another system embodiment, the system may comprise one or more hardware processors and one or more computer-readable media having executable instructions embodied thereon. When the executable instructions are executed by the one or more processors, the one or more hardware processors may execute actions, operations, or steps may include or comprise accessing network traffic (NT) data. The NT data may encode at least one domain name resolution (DNR) transaction. The at least one DNR transaction may be associated with a plurality of addresses. The plurality of addresses may include a plurality of domain name system (DNS) addresses and a plurality of target addresses. The actions may employ the NT data to generate a graph data structure (or simply a data structure). The graph data structure may include a plurality of nodes representing the plurality of addresses and a plurality of edges. The plurality of nodes may include a plurality of DNS nodes that represents the plurality of DNS addresses. The plurality of nodes may additionally include a plurality of target nodes that represent the plurality of target addresses. The plurality of edges may connect each of the plurality of DNS nodes to one or more of the plurality of target nodes based on the at least one DNR transaction. The actions may further assign a node risk score to each of the plurality of nodes based on a structure of the graph data structure. A first portion of the plurality of nodes may be identified based on the node risk score assigned to each of the plurality of nodes. Each address of the plurality of addresses that is represented by a node that is included in the identified first portion of the plurality of nodes may be classified as a suspicious address. The actions may further provide an indication of at least one address of the plurality of addresses that has been classified as a suspicious address.

In some system embodiments, the actions may further include accessing historical NT data. The historical NT data may encode at least one historical DNR transaction. The at least one historical DNR transaction may be associated with a plurality of historical addresses. The plurality of historical addresses that may include a plurality of historical DNS addresses and a plurality of historical target addresses. Each historical DNR transaction of the at least one historical DNR transaction may have occurred prior to each DNR transaction of the at least one DNR transaction. The historical NT data may be employed to generate a historical graph data structure. The historical graph data structure may including a plurality of historical nodes and a plurality of historical edges. The plurality of historical nodes may represent the plurality of historical addresses. The plurality of historical nodes may include a plurality of historical DNS nodes that represent the plurality of historical DNS addresses. The plurality of historical nodes may additional include a plurality of historical target nodes that represent the plurality of historical target addresses. The plurality of historical edges may connect each of the plurality of historical DNS nodes to one or more of the plurality of historical target nodes based on the at least one historical DNR transaction. The actions may further include assigning the node risk score to each node of the plurality of nodes based on a comparison between the graph data structure and the historical graph data structure.

In some system embodiments, the actions may further include employing a community detection algorithm to detect a plurality of communities for the graph data structure. Each community of the plurality of communities may include a unique portion of the plurality of nodes. An intra-community edge density for a particular community of the plurality of communities may be greater than an inter-community edge density between the particular community and any other community of the plurality of communities. A community risk score may be assigned to each community of the plurality of communities. The community risk score may be based on the comparison between the graph data structure and the historical graph data structure. The actions may further include assigning the node risk score to each of the plurality of nodes based on the community risk score of each community that the node is included in.

In some system embodiments, the community risk score assigned to each community of the plurality of communities may be determined further based on a fraction of target nodes of the plurality of target nodes that are included in the community and are excluded from the plurality of historical target addresses. The community risk score assigned to each community of the plurality of communities may be determined further based on a fraction of DNS nodes of the plurality of DNS nodes that are included in the community and are excluded from the plurality of historical DNS addresses. In some system embodiments, the community risk score assigned to each community of the plurality of communities may be determined further based on a fraction of DNS nodes of the plurality of DNS nodes that are connected to a target node of the plurality of target nodes that is included in the community and is excluded from the plurality of historical DNS addresses. In still other system embodiments, the actions may further include assigning a traffic score to each node of the plurality of nodes. The traffic score may be based on a fraction of network traffic associated with an address of the plurality of address that is represented by the node compared to a total network traffic associated with the network traffic data. The node risk score for each node of the plurality of nodes may determined be based on the traffic score assigned to the node.

In still other system embodiments, the actions may further include identifying a second portion of the plurality of nodes. Each node included in the second portion of the plurality of nodes may be ground-truth labeled as a suspicious node. A third portion of the plurality of nodes may be identified. Each node included in the third portion of the plurality of nodes may be unclassified. The actions may further include assigning the node risk score to each node included in the third portion of the plurality of nodes. The assigned node risk score may be based on a comparison of the nodes included in the third portion of the plurality of nodes and each node included in the second portion of the plurality of nodes. Such system embodiments may further include generating a vector representation for each node included in the second portion of the plurality of nodes. A vector representation may be generated for each node included in the third portion of the plurality of nodes. The actions may further include assigning the node risk score to each node included in the second portion of the plurality of nodes based on a comparison of the vector representation of the nodes included in the second portion of the plurality of nodes and the vector representation of each node included in the third portion of the plurality of nodes. In some system embodiments, the comparison of the node included in the third portion of the plurality of nodes and each node included in the second portion of the plurality of nodes is based on a belief propagation algorithm.

In another media embodiment, the media may store computer-useable instructions that, when used by one or more computing devices, cause the one or more computing devices to perform actions, operations, and/or steps. The actions may include and/or comprise accessing network traffic (NT) data. The NT data may encode at least one domain name resolution (DNR) transaction. The at least one DNR transaction may be associated with a plurality of addresses. The plurality of addresses may include a plurality of domain name system (DNS) addresses and a plurality of target addresses. The actions may employ the NT data to generate a graph data structure (or simply a data structure). The graph data structure may include a plurality of nodes representing the plurality of addresses and a plurality of edges. The plurality of nodes may include a plurality of DNS nodes that represents the plurality of DNS addresses. The plurality of nodes may additionally include a plurality of target nodes that represent the plurality of target addresses. The plurality of edges may connect each of the plurality of DNS nodes to one or more of the plurality of target nodes based on the at least one DNR transaction. The actions may further assign a node risk score to each of the plurality of nodes based on a structure of the graph data structure. A first portion of the plurality of nodes may be identified based on the node risk score assigned to each of the plurality of nodes. Each address of the plurality of addresses that is represented by a node that is included in the identified first portion of the plurality of nodes may be classified as a suspicious address. The actions may further provide an indication of at least one address of the plurality of addresses that has been classified as a suspicious address.

In some media embodiments, the actions may further include accessing historical NT data. The historical NT data may encode at least one historical DNR transaction. The at least one historical DNR transaction may be associated with a plurality of historical addresses. The plurality of historical addresses that may include a plurality of historical DNS addresses and a plurality of historical target addresses. Each historical DNR transaction of the at least one historical DNR transaction may have occurred prior to each of DNR transaction of the at least one DNR transaction. The historical NT data may be employed to generate a historical graph data structure. The historical graph data structure may including a plurality of historical nodes and a plurality of historical edges. The plurality of historical nodes may represent the plurality of historical addresses. The plurality of historical nodes may include a plurality of historical DNS nodes that represent the plurality of historical DNS addresses. The plurality of historical nodes may additional include a plurality of historical target nodes that represent the plurality of historical target addresses. The plurality of historical edges may connect each of the plurality of historical DNS nodes to one or more of the plurality of historical target nodes based on the at least one historical DNR transaction. The actions may further include assigning the node risk score to each node of the plurality of nodes based on a comparison between the graph data structure and the historical graph data structure.

In some media embodiments, the actions may further include employing a community detection algorithm to detect a plurality of communities for the graph data structure. Each community of the plurality of communities may include a unique portion of the plurality of nodes. An intra-community edge density for a particular community of the plurality of communities may be greater than an inter-community edge density between the particular community and any other community of the plurality of communities. A community risk score may be assigned to each community of the plurality of communities. The community risk score may be based on the comparison between the graph data structure and the historical graph data structure. The actions may further include assigning the node risk score to each of the plurality of nodes based on the community risk score of each community that the node is included in.

In some media embodiments, the community risk score assigned to each community of the plurality of communities may be determined further based on a fraction of target nodes of the plurality of target nodes that are included in the community and are excluded from the plurality of historical target addresses. The community risk score assigned to each community of the plurality of communities may be determined further based on a fraction of DNS nodes of the plurality of DNS nodes that are included in the community and are excluded from the plurality of historical DNS addresses. In some media embodiments, the community risk score assigned to each community of the plurality of communities may be determined further based on a fraction of DNS nodes of the plurality of DNS nodes that are connected to a target node of the plurality of target nodes that is included in the community and is excluded from the plurality of historical DNS addresses. In still other media embodiments, the actions may further include assigning a traffic score to each node of the plurality of nodes. The traffic score may be based on a fraction of network traffic associated with an address of the plurality of address that is represented by the node compared to a total network traffic associated with the network traffic data. The node risk score for each node of the plurality of nodes may determined be based on the traffic score assigned to the node.

In still other media embodiments, the actions may further include identifying a second portion of the plurality of nodes. Each node included in the second portion of the plurality of nodes may be ground-truth labeled as a suspicious node. A third portion of the plurality of nodes may be identified. Each node included in the third portion of the plurality of nodes may be unclassified. The actions may further include assigning the node risk score to each node included in the third portion of the plurality of nodes. The assigned node risk score may be based on a comparison of the nodes included in the third portion of the plurality of nodes and each node included in the second portion of the plurality of nodes. Such media embodiments may further include generating a vector representation for each node included in the second portion of the plurality of nodes. A vector representation may be generated for each node included in the third portion of the plurality of nodes. The actions may further include assigning the node risk score to each node included in the second portion of the plurality of nodes based on a comparison of the vector representation of the nodes included in the second portion of the plurality of nodes and the vector representation of each node included in the third portion of the plurality of nodes. In some media embodiments, the comparison of the node included in the third portion of the plurality of nodes and each node included in the second portion of the plurality of nodes is based on a belief propagation algorithm.

Generalized Computing Device

Figure 8:
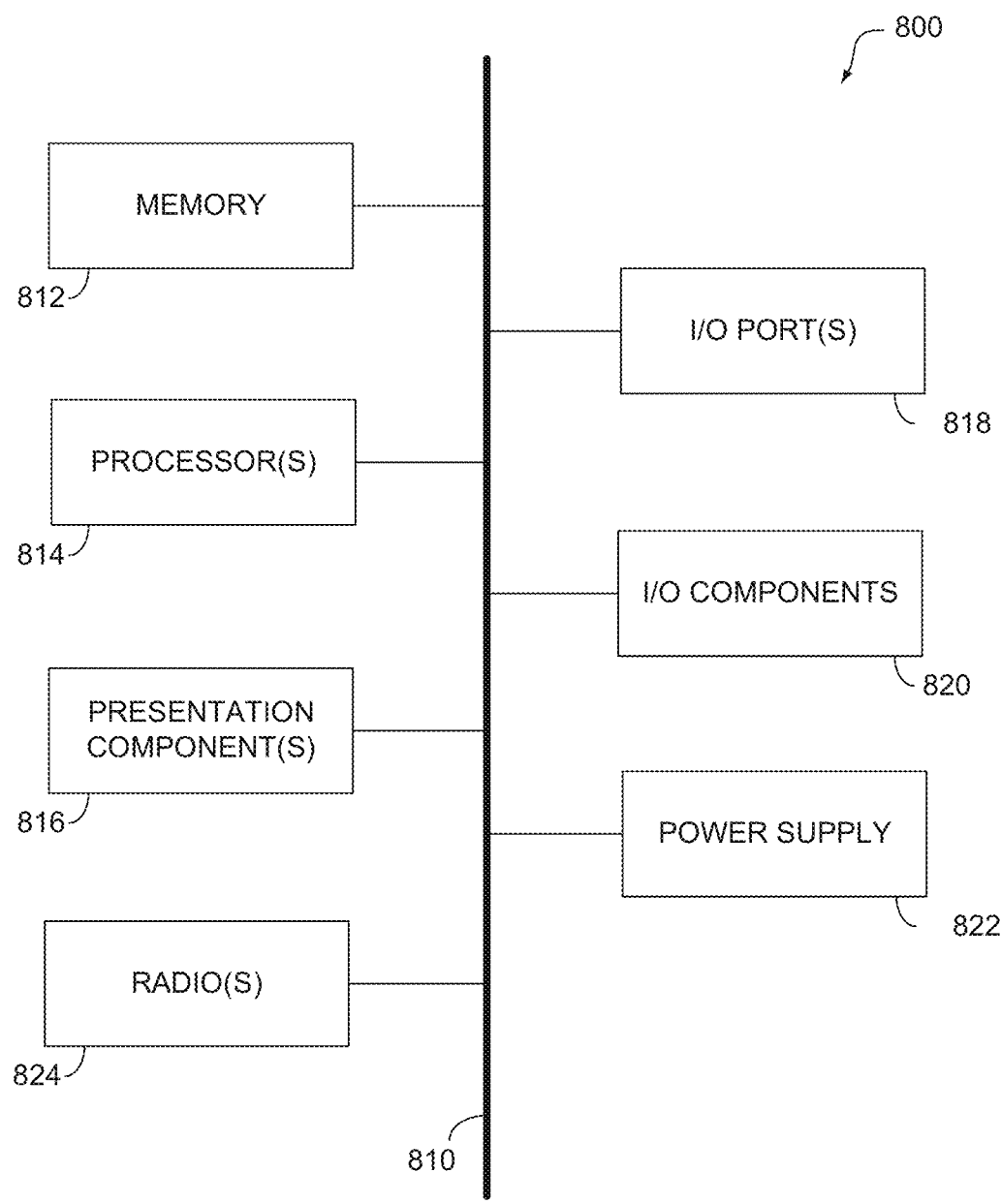
FIG. 8 is a block diagram of an exemplary computing environment suitable for use in implementing aspects of the technology described herein.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. Bus 810 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors 814 that read data from various entities such as memory 812 or I/O components 820. Presentation component(s) 816 presents data indications to a user or other device. In some implementations, presentation component 220 of system 200 may be embodied as a presentation component 816. Other examples of presentation components may include a display device, speaker, printing component, vibrating component, and the like.

The I/O ports 818 allow computing device 800 to be logically coupled to other devices, including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 may include one or more radio(s) 824 (or similar wireless communication components). The radio 824 transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present disclosure.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for identifying suspicious communication network assets, the method comprising:

accessing network traffic (NT) data that encodes at least one domain name resolution (DNR) transaction associated with a plurality of addresses that includes a plurality of domain name system (DNS) addresses and at least one target address;

employing the NT data to generate a graph data structure including a plurality of nodes with each node representing an address from the plurality of addresses and a plurality of edges, the plurality of nodes including a plurality of DNS nodes with each DNS node representing a DNS address from the plurality of DNS addresses and at least one target node representing the at least one target address, and at least one edge from the plurality of edges connecting each of the plurality of DNS nodes to at least one of the at least one target node based on the at least one DNR transaction;

identifying a first portion of the plurality of nodes, each node included in the first portion of the plurality of nodes is ground-truth labeled as a suspicious node;

identifying a second portion of the plurality of nodes, each node included in the second portion of the plurality of nodes is unclassified; and assigning a node risk score to each node included in the second portion of the plurality of nodes, based on a comparison of the nodes included in the second portion of the plurality of nodes and each node included in the first portion of the plurality of nodes;

based on the node risk score assigned to each of the plurality of nodes in the second portion, identifying a third portion of the plurality of nodes;

classifying each address of the plurality of addresses that is represented by a node included in the third portion of the plurality of nodes as a suspicious address; and providing an indication of at least one address of the plurality of addresses that has been classified as a suspicious address.

2. The method of claim 1, wherein the method further comprises:

accessing historical NT data that encodes at least one historical DNR transaction associated with a plurality of historical addresses that includes a plurality of historical DNS addresses and at least one historical target address, each historical DNR transaction of the at least one historical DNR transaction occurred prior to each DNR transaction of the at least one DNR transaction;

employing the historical NT data to generate a historical graph data structure including a plurality of historical nodes with each historical node representing a historical address from the plurality of historical addresses and a plurality of historical edges, the plurality of historical nodes including a plurality of historical DNS nodes with each historical DNS node representing a historical DNS address from the plurality of historical DNS addresses and at least one historical target node representing the at least one historical target address, and at least one historical edge from the plurality of historical edges connecting each of the plurality of historical DNS nodes to at least one of the at least one historical target node based on the at least one historical DNR transaction; and based on a comparison between the graph data structure and the historical graph data structure, assigning the node risk score to each node of the plurality of nodes.

3. The method of claim 2, further comprising:

employing a community detection algorithm to detect a plurality of communities for the graph data structure, each community of the plurality of communities includes a unique portion of the plurality of nodes and an intra-community edge density for a particular community of the plurality of communities is greater than an inter-community edge density between the particular community and any other community of the plurality of communities;

based on the comparison between the graph data structure and the historical graph data structure, assigning a community risk score to each community of the plurality of communities; and based on the community risk score of each community that the node is included in, assigning the node risk score to each of the plurality of nodes.

4. The method of claim 3, wherein the community risk score assigned to each community of the plurality of communities is determined further based on a fraction of target nodes of the at least one target node that are included in the community and are excluded from the at least one historical target address.

5. The method of claim 3, wherein the community risk score assigned to each community of the plurality of communities is determined further based on a fraction of DNS nodes of the plurality of DNS nodes that are included in the community and are excluded from the plurality of historical DNS addresses.

6. The method of claim 3, wherein the community risk score assigned to each community of the plurality of communities is determined further based on a fraction of DNS nodes of the plurality of DNS nodes that are connected to a target node of the at least one target node that is included in the community and is excluded from the plurality of historical DNS addresses.

7. The method of claim 1, further comprising:

assigning a traffic score, to each node of the plurality of nodes, that is based on a fraction of network traffic associated with an address of the plurality of address that is represented by the node compared to a total network traffic associated with the network traffic data; and based on the traffic score assigned to the node, determining the node risk score for each node of the plurality of nodes.

8. The method of claim 1, further comprising:

generating a vector representation for each node included in the first portion of the plurality of nodes;

generating a vector representation for each node included in the second portion of the plurality of nodes; and assigning the node risk score, to each node included in the first portion of the plurality of nodes, based on a comparison of the vector representation of the nodes included in the first portion of the plurality of nodes and the vector representation of each node included in the second portion of the plurality of nodes.

9. The method of claim 1, wherein the comparison of the node included in the second portion of the plurality of nodes and each node included in the first portion of the plurality of nodes is based on a belief propagation algorithm.

10. A system comprising:

one or more hardware processors; and one or more computer-readable media having executable instructions embodied thereon, which, when executed by the one or more processors, cause the one or more hardware processors to execute actions comprising:

accessing network traffic (NT) data that encodes at least one domain name resolution (DNR) transaction associated with a plurality of addresses that includes a plurality of domain name system (DNS) addresses and at least one target address;

employing the NT data to generate a data structure including a plurality of nodes with each node representing an address from the plurality of addresses and a plurality of edges, the plurality of nodes including a plurality of DNS nodes with each DNS node representing an address from the plurality of DNS addresses and at least one target node representing the at least one target address, and at least one edge from the plurality of edges connecting each of the plurality of DNS nodes to at least one of the at least one target node based on the at least one DNR transaction;

accessing historical NT data that encodes at least one historical DNR transaction associated with a plurality of historical addresses that includes a plurality of historical DNS addresses and at least one historical target address, each historical DNR transaction of the at least one historical DNR transaction occurred prior to each DNR transaction of the at least one DNR transaction;

employing the historical NT data to generate a historical data structure including a plurality of historical nodes representing the plurality of historical addresses and a plurality of historical edges, the plurality of historical nodes including a plurality of historical DNS nodes representing the plurality of historical DNS addresses and at least one historical target node representing the at least one historical target address, and the plurality of historical edges connecting each of the plurality of historical DNS nodes to at least one of the at least one historical target node based on the at least one historical DNR transaction;

based on a comparison between the data structure and the historical data structure, assigning the node risk score to each node of the plurality of nodes;

based on the node risk score assigned to each of the plurality of nodes, identifying a first portion of the plurality of nodes;

classifying each address of the plurality of addresses that is represented by a node included in the identified first portion of the plurality of nodes as a suspicious address;

providing an indication of at least one address of the plurality of addresses that has been classified as a suspicious address.

11. The system of claim 10, wherein the actions further comprise:

employing a community detection algorithm to detect a plurality of communities for the data structure, each community of the plurality of communities includes a unique portion of the plurality of nodes and an intra-community edge density for a particular community of the plurality of communities is greater than an inter-community edge density between the particular community and any other community of the plurality of communities;

based on the comparison between the data structure and the historical data structure, assigning a community risk score to each community of the plurality of communities; and based on the community risk score of each community that the node is included in, assigning the node risk score to each of the plurality of nodes.

12. The system of claim 10, wherein the actions further comprising:

assigning a traffic score, to each node of the plurality of nodes, that is based on a fraction of network traffic associated with an address of the plurality of address that is represented by the node compared to a total network traffic associated with the network traffic data; and based on the traffic score assigned to the node, determining the node risk score for each node of the plurality of nodes.

13. The system of claim 10, wherein the actions further comprise:

identifying a second portion of the plurality of nodes, each node included in the second portion of the plurality of nodes is ground-truth labeled as a suspicious node;

identifying third portion of the plurality of nodes, each node included in the third portion of the plurality of nodes is unclassified; and assigning the node risk score, to each node included in the third portion of the plurality of nodes, based on a comparison of the nodes included in the third portion of the plurality of nodes and each node included in the second portion of the plurality of nodes.

14. The system of claim 13, wherein the actions further comprise:

generating a vector representation for each node included in the second portion of the plurality of nodes;

generating a vector representation for each node included in the third portion of the plurality of nodes; and assigning the node risk score to each node included in the second portion of the plurality of nodes based on a comparison of the vector representation of the nodes included in the second portion of the plurality of nodes and the vector representation of each node included in the third portion of the plurality of nodes.

15. The system of claim 13, wherein the comparison of the node included in the third portion of the plurality of nodes and each node included in the second portion of the plurality of nodes is based on a belief propagation algorithm.

16. One or more non-transitory computer storage media storing computer-useable instructions that, when used by one or more computing devices, cause the one or more computing devices to perform actions comprising:

accessing network traffic (NT) data that encodes at least one domain name resolution (DNR) transaction associated with a plurality of addresses that includes a plurality of domain name system (DNS) addresses and at least one target address;

employing the NT data to generate a graph data structure including a plurality of nodes representing the plurality of addresses and a plurality of edges, the plurality of nodes including a plurality of DNS nodes representing the plurality of DNS addresses and at least one target node representing the at least one target address, and the plurality of edges connecting each of the plurality of DNS nodes to at least one of the at least one target node based on the at least one DNR transaction;

accessing historical NT data that encodes at least one historical DNR transaction associated with a plurality of historical addresses that includes a plurality of historical DNS addresses and at least one historical target address, each historical DNR transaction of the at least one historical DNR transaction occurred prior to each DNR transaction of the at least one DNR transaction;

employing the historical NT data to generate a historical graph data structure including a plurality of historical nodes representing the plurality of historical addresses and a plurality of historical edges, the plurality of historical nodes including a plurality of historical DNS nodes representing the plurality of historical DNS addresses and at least one historical target node representing the at least one historical target address, and the plurality of historical edges connecting each of the plurality of historical DNS nodes to at least one of the at least one historical target node based on the at least one historical DNR transaction;

based on a comparison between the graph data structure and the historical graph data structure, assigning the node risk score to each node of the plurality of nodes;

based on the node risk score assigned to each of the plurality of nodes, identifying a first portion of the plurality of nodes;

classifying each address of the plurality of addresses that is represented by a node included in the identified first portion of the plurality of nodes as a suspicious address;

providing an indication of at least one address of the plurality of addresses that has been classified as a suspicious address.

17. The media of claim 16, wherein the operations further comprise:

identifying a second portion of the plurality of nodes, each node included in the second portion of the plurality of nodes is ground-truth labeled as a suspicious node;

identifying third portion of the plurality of nodes, each node included in the third portion of the plurality of nodes is unclassified; and assigning the node risk score to each node included in the third portion of the plurality of nodes based on a comparison of the nodes included in the third portion of the plurality of nodes and each node included in the second portion of the plurality of nodes.

\* \* \* \* \*